United States Patent
Hutton

(10) Patent No.: US 7,469,782 B2
(45) Date of Patent: Dec. 30, 2008

(54) CONVEYOR SYSTEM FOR LOADING AND UNLOADING AIRCRAFT BAGGAGE

(75) Inventor: Neil Hutton, Ottawa (CA)

(73) Assignee: Dew Engineering and Development Limited, Ottawa, Ontario (CA)

( * ) Notice: Subject to any disclaimer, the term of this patent is extended or adjusted under 35 U.S.C. 154(b) by 487 days.

(21) Appl. No.: 11/186,864

(22) Filed: Jul. 22, 2005

(65) Prior Publication Data

US 2007/0020069 A1  Jan. 25, 2007

(51) Int. Cl.
*B65G 15/60* (2006.01)

(52) U.S. Cl. .................... 198/812; 198/588; 198/594; 414/528; 414/679

(58) Field of Classification Search .......... 414/345–347, 414/373; 198/584, 812, 588, 594; 244/137.1; 403/DIG. 1; 213/75 D
See application file for complete search history.

(56) References Cited

U.S. PATENT DOCUMENTS

| | | | | | |
|---|---|---|---|---|---|
| 2,346,659 | A | * | 4/1944 | Bruce | 198/303 |
| 2,494,302 | A | * | 1/1950 | Mason | 193/35 F |
| 2,648,422 | A | * | 8/1953 | Kling | 198/589 |
| 3,356,236 | A | * | 12/1967 | Shaw et al. | 414/398 |
| 3,741,504 | A | * | 6/1973 | Alberti et al. | 244/137.1 |
| 3,799,479 | A | * | 3/1974 | Roeder et al. | 244/137.1 |
| 4,780,043 | A | * | 10/1988 | Fenner et al. | 414/502 |
| 4,860,973 | A | * | 8/1989 | Fenner | 244/137.1 |
| 5,000,646 | A | * | 3/1991 | Pietropaoli | 414/503 |
| 5,048,704 | A | * | 9/1991 | Takahashi | 213/75 D |
| 5,681,202 | A | * | 10/1997 | Sander | 446/138 |
| 6,006,893 | A | * | 12/1999 | Gilmore et al. | 198/588 |
| 6,431,346 | B1 | * | 8/2002 | Gilmore et al. | 198/588 |
| 6,823,985 | B2 | * | 11/2004 | Gilmore et al. | 198/588 |
| 6,893,200 | B2 | * | 5/2005 | Thøgersen | 414/345 |
| 7,033,125 | B2 | * | 4/2006 | Thogersen | 414/345 |
| 7,156,604 | B2 | * | 1/2007 | Thogersen | 414/345 |
| 7,261,202 | B1 | * | 8/2007 | Canapa | 198/812 |
| 2003/0049107 | A1 | | 3/2003 | Thogersen | |
| 2003/0161707 | A1 | | 8/2003 | Thogersen | |
| 2004/0105740 | A1 | | 6/2004 | Thogersen | |

FOREIGN PATENT DOCUMENTS

| | | | |
|---|---|---|---|
| DE | 10007332 A1 | * | 1/2002 |
| WO | WO 89/02852 A1 | | 4/1989 |
| WO | WO 8902852 A1 | * | 4/1989 |
| WO | WO 98/54073 A1 | | 12/1998 |
| WO | WO 9854073 A1 | * | 12/1998 |
| WO | WO 2005/073110 A1 | | 8/2005 |
| WO | WO 2005/092706 A1 | | 10/2005 |

* cited by examiner

*Primary Examiner*—Saúl J Rodríguez
*Assistant Examiner*—Joshua I Rudawitz
(74) *Attorney, Agent, or Firm*—Mark Robert Weir; Freedman & Associates

(57) ABSTRACT

A cargo conveyor for use in loading and unloading a cargo compartment comprises: a plurality of conveyor units for being disposed within the cargo compartment and for being temporarily arranged to support a loading or unloading conveyor path having a length that varies during a same loading or unloading operation, the conveyor path for being lengthened during the unloading operation and for being shortened during the loading operation, the plurality of conveyor units for being coupled with and decoupled from the conveyor path for lengthening the conveyor path during the unloading operation and for shortening the conveyor path during the loading operation, respectively.

18 Claims, 18 Drawing Sheets

106

CONVEYOR SYSTEM FOR LOADING AND UNLOADING AIRCRAFT BAGGAGE

FIELD OF THE INVENTION

The instant invention relates generally to airport ground service systems, and more particularly to a conveyor system for loading and unloading aircraft baggage.

BACKGROUND

Air travel is a common mode of transportation. One of the major challenges associated with air travel relates to managing the large amount of baggage that accompanies the passengers aboard an aircraft. Typically, each passenger checks at least one piece of baggage before boarding the aircraft. The baggage is tagged and placed on carts that are wheeled out of the airport terminal building and up to the waiting aircraft. The baggage is then loaded into one of the lower cargo compartments of the aircraft, and travels with the passenger to their destination.

In the case of larger, wide-body aircraft, typically the cargo compartments are sufficiently roomy to accommodate luggage containers, which are packed full of luggage prior to being wheeled out of the airport terminal building. The luggage containers are lifted into the cargo compartment by mechanical means, and are maneuvered into position along roller beds that are permanently mounted inside the aircraft cargo compartment. Advantageously, the cargo containers may be packed in advance and lifted into the cargo compartment as soon as the baggage from a previous flight is unloaded. Furthermore, the use of mechanical lifting means and roller beds reduces the risk of injuries to baggage handlers, since manual lifting is kept to a minimum or is eliminated entirely.

However, current market forces have resulted in a shift toward using smaller, narrow-body aircraft, especially on domestic routes. Due to the smaller overall dimensions of the aircraft, the lower cargo compartments of a narrow-body aircraft tend to be quite cramped, often requiring the baggage handler to crawl around the compartment, and to sit or kneel while manipulating baggage, etc. For instance, the forward cargo compartment of a Boeing 757-200 is only 1.12 meters (44 inches) at its highest point, with a flat-floor surface of only 1.26 meters (49.8 inches) across.

A prior art method for loading and unloading baggage of a narrow-body aircraft uses a specialized mobile vehicle, which is known in the industry as a belt loader, that is equipped with a conveyor ramp, the inclination of which is adjustable for accommodating cargo compartment doorways at different heights above the ground. The belt loader is positioned such that one end of the conveyor ramp is adjacent to the cargo compartment doorway. During unloading, baggage handlers inside the cargo compartment lift the baggage onto the conveyor belt, which transports the baggage to a wheeled cart that is waiting below. To load baggage into the cargo compartment, the baggage is moved from a wheeled cart onto the conveyor ramp, carried up the ramp to the cargo compartment doorway, lifted off the ramp by a baggage handler, slid along the floor of the cargo compartment by one or more additional baggage handlers, and-lifted-onto a pile of baggage near the aft portion of the hold. Unfortunately, multiple baggage handlers within the cargo compartment adds to the congestion within the small space, increases the chances of an injury occurring, and increases the operating cost of each flight. Furthermore, turn-around times of narrow-body aircraft on a busy domestic route can be quite short, such as for instance 15 to 20 minutes. The need to load and unload baggage quickly, in combination with cramped working quarters and awkward lifting positions, creates prime conditions for serious back injuries to the baggage handlers.

Telair International provides a baggage handling system for narrow-body aircraft. The Sliding Carpet Loading System is a permanently installed system that uses a poly-coated Kevlar® conveyor belt to move baggage within the compartment. A single worker, stationed at the cargo compartment door area, loads baggage onto the conveyor and then activates the system. The conveyor automatically transports the load into the hold, thereby creating space for more baggage near the opening. During unloading, the system advances baggage towards the cargo compartment door area where it can easily be accessed. Unfortunately, the additional weight of the permanently installed system requires the use of additional fuel for every flight. In a market environment that sees airlines adding fuel surcharges to ticket prices, in order to pass along to their passengers the increasing cost of jet fuel, it is desirable to reduce fuel consumption rather than increase it by adding weight unnecessarily to the aircraft.

Fenner et al. in U.S. Pat. No. 4,780,043 discloses a modular cargo loading and unloading system for use with standard size aircraft, such as a Boeing 727 or 757. The system includes a doorway transfer unit and a plurality of longitudinal units. Each longitudinal unit includes a pair of parallel conveyor belts, and is sized to fit the width of the cargo compartment. The modular conveyor units are tied down using a quick-change mechanism that allows the units to be quickly installed and removed, so as to allow an aircraft to be readily converted from one configuration to another configuration. However, the conveyor system is designed specifically for conveying a small number of relatively large cargo containers, which are pre-loaded with cargo or baggage items. In particular, the cargo containers are too large to be "man-handled." During use, the conveyor system transports the cargo containers into the cargo compartment, and the modules are sequentially deenergized as they become filled with cargo. In other words, the modules remain in the aircraft cargo compartment after the cargo compartment is loaded, with the cargo containers resting on top of the modules. Furthermore, the complex operation of the doorway transfer unit, which involves deenergizing a set of lateral conveyor belts and rollers, raising a set of longitudinal conveyor belts and rollers, and energizing the set of longitudinal conveyor belts and rollers, is not well suited for handling a large number of closely spaced baggage items for bulk loading the cargo compartment. Accordingly, the modular conveyor system of Fenner et al. is not easily adapted for use with traditional bulk loading practices that are normally employed with standard size aircraft, but requires specialized cargo containers and belt loaders that are capable of conveying such containers.

Another prior art system, referred to as the RampSnake®, is disclosed in U.S. Pat. No. 6,893,200. By use of individual powered rollers the RampSnake® is extended and retracted at a 90-degree angle inside the aircraft. Baggage, cargo and mail are positively conveyed, and front and rear lifters take away the need to lift baggage, cargo and mail. Advantageously, the RampSnake® is completely removed from the cargo compartment after loading/unloading is complete, with the individual powered rollers being stored inside a specially designed vehicle. Unfortunately, the system is very complicated and existing belt loaders cannot be retrofitted for use with the RampSnake®.

It would be advantageous to provide a baggage handling system that overcomes at least some of the above-mentioned limitations of the prior art.

SUMMARY OF EMBODIMENTS OF THE INVENTION

In accordance with an aspect of the instant invention there is provided an apparatus for loading and unloading a cargo compartment of an aircraft, comprising: a plurality of conveyor units for being disposed within the cargo compartment of the aircraft, each conveyor unit having a first end for receiving cargo and a second end for discharging cargo, the first end of each conveyor unit configured for communicating with the second end of an adjacent conveyor unit so as to form a conveyor path having a length, wherein the number of conveyor units of the plurality of conveyor units is variable during a loading or unloading operation for controllably adjusting the length of the conveyor path between a first end and a second end thereof.

In accordance with another aspect of the instant invention there is provided an apparatus for loading and unloading a cargo compartment of an aircraft, comprising: a first conveyor unit for being disposed within the cargo compartment of the aircraft and having a first end for receiving cargo and a second end for discharging cargo along a direction of travel; a second conveyor unit for being disposed within the cargo compartment of the aircraft and having a first end that is detachably connectable to the second end of the first conveyor unit for receiving cargo therefrom along the direction of travel; and, a coupling mechanism having a first portion mounted to the first conveyor unit and having a second portion mounted to the second conveyor unit, the first and second portions of the coupling mechanism for cooperating to retain the first conveyor unit and the second conveyor unit in a fixed orientation one relative to the other when in a coupled condition so as to define a conveyor path having a first end and having a second end opposite the first end.

According to another aspect of the instant invention there is provided an apparatus for loading and unloading a cargo compartment of an aircraft, comprising: an angled conveyor unit for being disposed within the cargo compartment of the aircraft and having a first end for receiving and discharging cargo along a first direction and having a second end for receiving and discharging cargo along a second direction that is approximately normal to the first direction, the first end of the first conveyor unit being fixedly oriented relative to the second end of the first conveyor unit; and, a plurality of linear conveyor units for being disposed within the cargo compartment of the aircraft, each linear conveyor unit having a first end and a second end that is opposite the first end, at least one of the linear conveyor units having a first end configured for being detachably connected to the second end of the angled conveyor unit, and the other linear conveyor units having a first end configured for being detachably connected to the second end of another linear conveyor unit, the plurality of linear conveyor units defining a conveyor path when in an assembled condition, the conveyor path having a length extending along the second direction, wherein the number of linear conveyor units of the plurality of linear conveyor units is variable during a loading or unloading operation for controllably adjusting the length of the conveyor path.

According to another aspect of the instant invention, there is provided a cargo conveyor for use in loading and unloading a cargo compartment, comprising: a plurality of conveyor units for being disposed within the cargo compartment and for being temporarily arranged to support a loading or unloading conveyor path having a length that varies during a same loading or unloading operation, the conveyor path for being lengthened during the unloading operation and for being shortened during the loading operation, the plurality of conveyor units for being coupled with and decoupled from the conveyor path for lengthening the conveyor path during the unloading operation and for shortening the conveyor path during the loading operation, respectively.

According to another aspect of the instant invention, there is provided a method for loading and unloading a cargo compartment of an aircraft, comprising: providing a plurality of conveyor units within a cargo compartment of an aircraft; assembling the plurality of conveyor units in an end-to-end fashion so as to define a conveyor path within the cargo compartment of the aircraft; conveying baggage items along the conveyor path along at least one of a loading direction and an unloading direction; disassembling the plurality of conveyor units; and, extracting the plurality of conveyor units in a disassembled condition from the cargo compartment of the aircraft.

According to another aspect of the instant invention, there is provided a method for loading and unloading a cargo compartment, comprising: providing a plurality of conveyor units to an edge of the cargo compartment; coupling together two conveyor units of the plurality of conveyor units in an end-to-end fashion so as to form a conveyor path within the cargo compartment for conveying baggage items; moving at least a baggage item from a first space within the cargo compartment to the conveyor path; and, adding a third conveyor unit to the end of the conveyor path and within the first space, such that the third conveyor unit occupies at least a portion of the first space from which the at least a baggage item was moved.

BRIEF DESCRIPTION OF THE DRAWINGS

Exemplary embodiments of the invention will now be described in conjunction with the following drawings, in which similar reference numbers designate similar items:

FIG. 8b is a diagrammatic top view showing one step of a method for handling baggage using the conveyor system of FIG. 8a;

FIG. 8c is a diagrammatic top view showing another step of a method for handling baggage using the conveyor system of FIG. 8a;

FIG. 8d is a diagrammatic top view showing another step of a method for handling baggage using the conveyor system of FIG. 8a;

FIG. 8e is a diagrammatic top view showing another step of a method for handling baggage using the conveyor system of FIG. 8a;

DESCRIPTION OF EMBODIMENTS OF THE INVENTION

The following description is presented to enable a person skilled in the art to make and use the invention, and is provided in the context of a particular application and its requirements. Various modifications to the disclosed embodiments will be apparent to those skilled in the art, and the general principles defined herein may be applied to other embodiments and applications without departing from the spirit and the scope of the invention. Thus, the present invention is not intended to be limited to the embodiments disclosed, but is to be accorded the widest scope consistent with the principles and features disclosed herein.

Figure 1:
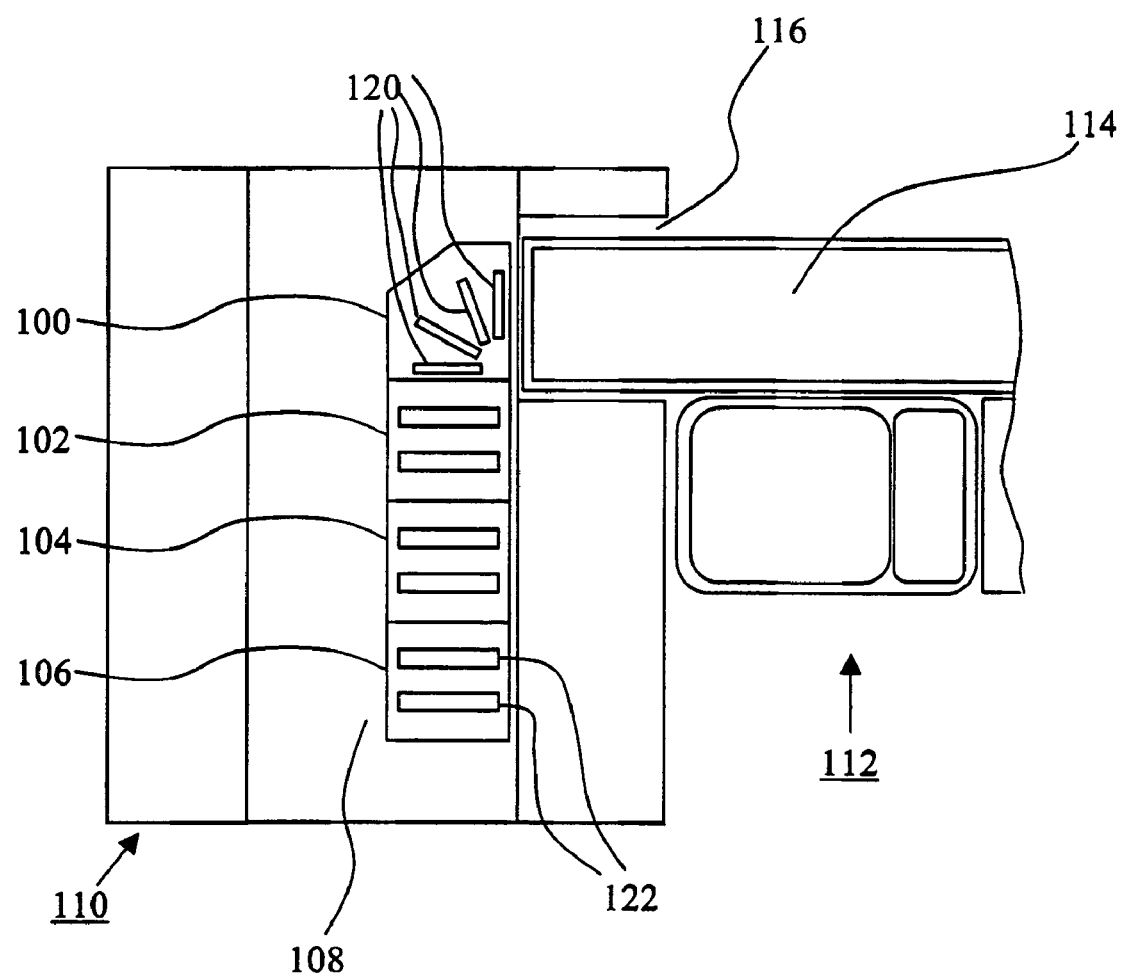
FIG. 1 is a diagrammatic top view of a conveyor system according to an embodiment of the instant invention, shown in an assembled condition within a cargo compartment of an aircraft.

Referring to FIG. 1, a conveyor system according to an embodiment of the instant invention is shown in diagrammatic top view in an assembled condition within a cargo compartment of an aircraft. The conveyor system includes a plurality of conveyor units 100, 102, 104 and 106 disposed in an end-to-end arrangement so as to define a conveyor path along a floor surface 108 of an aircraft lower cargo compartment 110. Also shown in FIG. 1 is a standard belt loader 112 having a conveyor ramp 114, the inclination of which is adjustable for being aligned with opening 116 of the cargo compartment 110. According to the instant embodiment, the conveyor unit 100 is provided in the form of an angled conveyor unit for directing baggage through a fixed angle about a point along the conveyor path. By way of non-limiting example, the conveyor unit 100 directs baggage through an approximately 90° turn between the opening 116 and the remaining conveyor units 102, 104 and 106. By way of non-limiting example, the conveyor system is shown throughout the figures in an arrangement that is suitable for loading and unloading a portion of a forward cargo compartment that is aft of the doorway opening. However, the conveyor unit 100 that is shown in FIG. 1 is alternatively rotated by 90° so as to be oriented toward a portion of either a forward or an aft cargo compartment that is forward of the doorway opening. In this case the same upper surface of the conveyor unit 100 is used to convey the baggage items. Alternatively, the conveyor unit 100 that is shown in FIG. 1 is "flipped-over" so as to be oriented toward a portion of either a forward or an aft cargo compartment that is forward of the doorway opening. In this case a lower surface of the conveyor unit 100 is used to convey the baggage items.

Referring still to FIG. 1, conveyor unit 100 includes a plurality of rollers 120 for engaging a lower surface of not illustrated baggage items passing there above. The rollers 120 of conveyor unit 100 are spaced further apart at one end compared to the other end, so as to define a curved path for advancing baggage items over the rollers. Optionally, the conveyor unit 100 includes a number of rollers that is greater than or less than four. Preferably, at least some of the rollers 120 of conveyor unit 100 are powered, but optionally the conveyor unit 100 does not include a powered roller and items a pushed manually over the conveyor unit 100. Further optionally, conveyor unit 100 is provided with another known roller arrangement for providing a curved conveyor path.

Similarly, each conveyor unit 102, 104 and 106 includes a plurality of rollers 122 for engaging a lower surface of not illustrated baggage items passing there above. By way of non-limiting example, each conveyor unit 102, 104 and 106 is shown with two rollers 122. Preferably, at least one roller of each conveyor unit 102, 104 and 106 is powered, but optionally at least some of the conveyor units 102, 104 and 106 do not include a powered roller. Optionally, at least some of the conveyor units 102, 104 and 106 include a number of rollers that is greater than two. Further optionally, the conveyor units 102, 104 and 106 are provided in the form of a not illustrated continuous belt conveyor, or in another known form that is suitable for conveying baggage items, such as for example a slider belt conveyor, a gravity conveyor, a skatewheel conveyor or a ball transfer table. For instance, a slider belt conveyor includes a plurality of parallel belts arranged one beside another between two rollers. Advantageously, a slider belt conveyor, including a plurality of parallel belts each having a length that is at least one and a half times their width, facilitates tracking over the relatively short conveying distance that is envisaged for each conveyor unit. Optionally, the slider bed over which the plurality of parallel belts slide is fabricated using ultra-high molecular weight plastic. Further optionally, the belts of the plurality of belts are circular in cross-section.

As shown in FIG. 1, the angled conveyor unit 100 is positioned adjacent the opening 116 of cargo compartment 110, proximate the end of conveyor ramp 114 that is closest the opening 116. Accordingly, the angled conveyor unit 100 forms an approximately continuous conveyor path with the conveyor ramp 114 and with the adjacent conveyor unit 102. During use, the conveying speed and direction of the conveyor units 100, 102 etc. are synchronized one-to-the-other, and are synchronized to the conveying speed and direction of conveyor ramp 114. In particular, the conveying speed of the conveyor units 100, 102 etc. is equal to or greater than the speed of the conveyor ramp 114. Optionally, the conveyor unit 100 is either secured to the floor using at least one of a not illustrated suction-cup, clamp, hook or other securing device disposed along a lower surface thereof, or is detachably coupled to the end of the conveyor ramp 114 nearest the opening 116. Preferably, each conveyor unit 100, 102, 104 and 106 is detachably connected to an adjacent conveyor unit. Optionally, the conveyor units 100, 102, 104 and 106 are placed in an end-to-end arrangement without being coupled together or otherwise secured in place.

As discussed above, it is preferable that each of the conveyor unit 100, 102, 104 and 106 include at least one roller that is powered. Optionally, each conveyor unit that includes a powered roller also includes an autonomous power source, such as for instance a rechargeable battery, for powering the powered roller. Further optionally, when the conveyor units 100, 102, 104 and 106 are detachably coupled one to another, an electrical connection is established that provides power to the coupled conveyor units from a centralized power source, such as for instance a rechargeable battery of the angled conveyor unit 100 or another power source located outside the cargo compartment 110.

Preferably, not illustrated controls are provided for allowing a user, such as for instance a baggage handler, to control and vary the conveying direction, conveying speed, and to switch the conveyor system on and off. By way of a non-limiting example, at least one of the conveyor units 100, 102, 104 and 106 includes a control panel that is accessible by the baggage handler. Alternatively, the baggage handler carries a remote control device through the cargo compartment 110. Optionally, the remote control device is wireless.

Figure 2A:
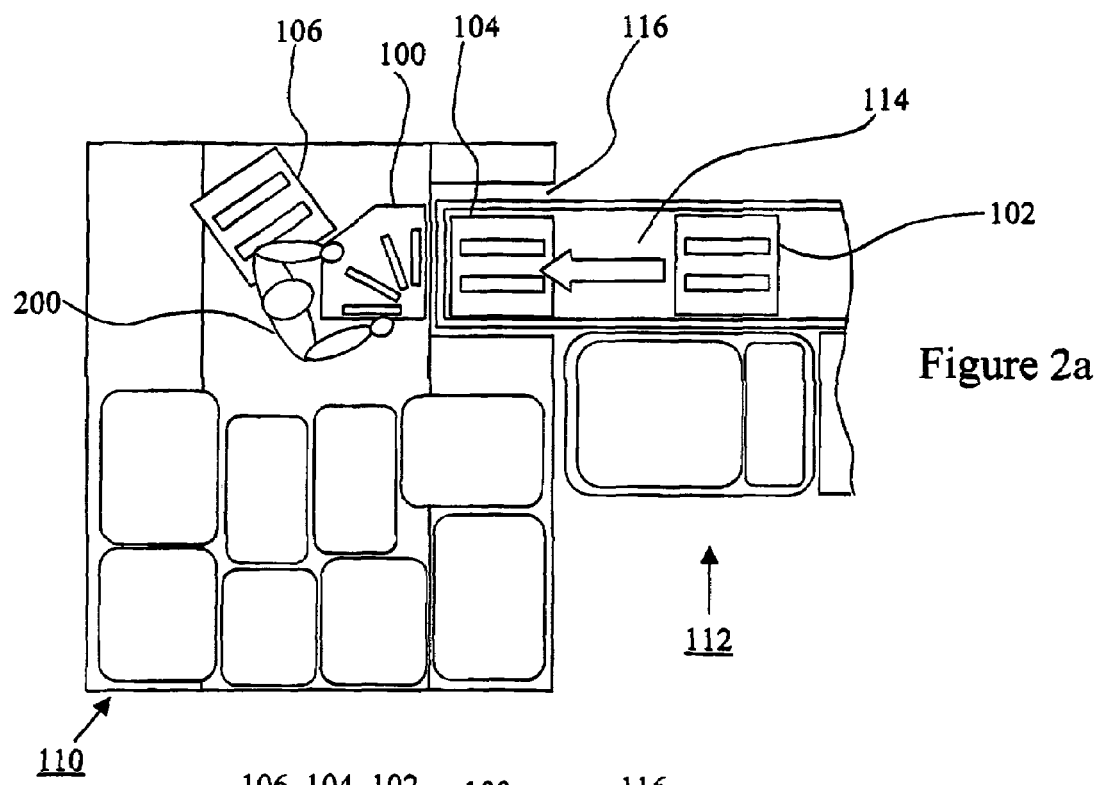
FIG. 2a is a diagrammatic top view showing one step of a method for handling baggage using the conveyor system of FIG. 1.

Referring now to FIGS. 2a through 2f, shown are diagrammatic top views of steps of a method for handling baggage using the conveyor system of FIG. 1. In FIG. 2a, a baggage handler 200 is shown inside the lower cargo compartment 110. The conveyor ramp 114 is shown conveying items, specifically the conveyor units 102 and 104, into the cargo compartment 110 via the opening 116. As such, the conveyor ramp 114 is operating initially in a direction opposite the direction that is required for unloading baggage from the cargo compartment 110, as is indicated in the figure using a block arrow. For most efficient operation, all conveyor units that are required for handling the baggage are conveyed into the cargo compartment 110 prior to any of the baggage being unloaded from the cargo compartment 110. Of course, in instances where there is insufficient room within the cargo compartment 110 to accommodate both the baggage handler 200 and the conveyor units 100, 102, 104 and 106, less efficient operation is still achieved by unloading some of the baggage near the opening 116 and then reversing the direction of conveyor ramp 114 to convey the conveyor units into the cargo compartment via the opening 116.

Preferably the angled conveyor unit 100 is the first conveyor unit to pass into the cargo compartment 110, and it is shown in FIG. 2a already in place adjacent the opening 116. In addition, the conveyor unit 106 is shown in a stowed position within the cargo compartment 110, close to the opening 116. The conveyor unit 106 forms the terminal portion of the conveyor path once the conveyor units 100, 102, 104 and 106 are fully assembled. Preferably, the conveyor unit 106 includes a plurality of wheels disposed along the lower surface thereof and preferably the upper surface is adapted for receiving the lower surface of another conveyor unit 102 or 104, so as to support stacking of a plurality of conveyor units on the conveyor unit 106. In this way, the conveyor unit 106 serves as a mobile base for supporting the other conveyor units when they are not in use, and in a manner that occupies the least amount of room within the cargo compartment 110.

Figure 2B:
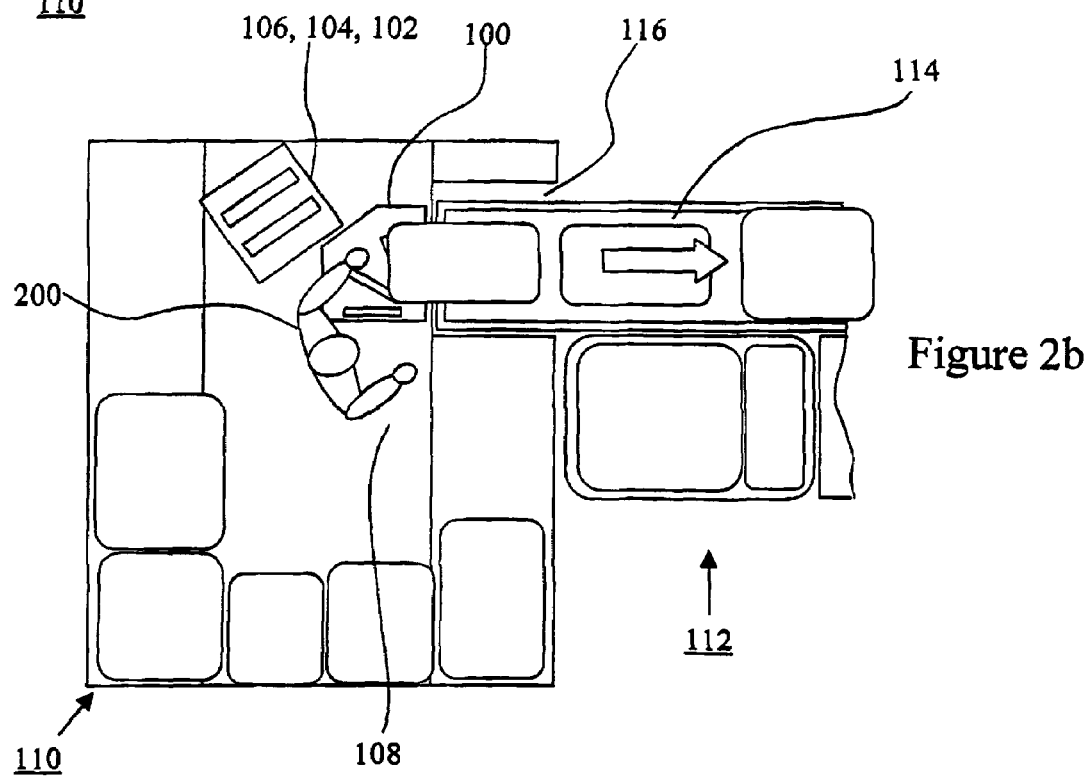
FIG. 2b is a diagrammatic top view showing another step of a method for handling baggage using the conveyor system of FIG. 1.

Referring now to FIG. 2b, the conveyor units 102, 104 and 106 are shown in a stacked arrangement close to the opening 116, and out of the way of the baggage handler 200. Items of baggage are being conveyed down the conveyor ramp 114, as indicated in the figure by the block arrow. As the baggage handler 200 continues to transfer baggage onto the conveyor unit 100 and subsequently down the conveyor ramp 114, a portion of the floor 108 adjacent the conveyor unit 100 is exposed.

Figure 2C:
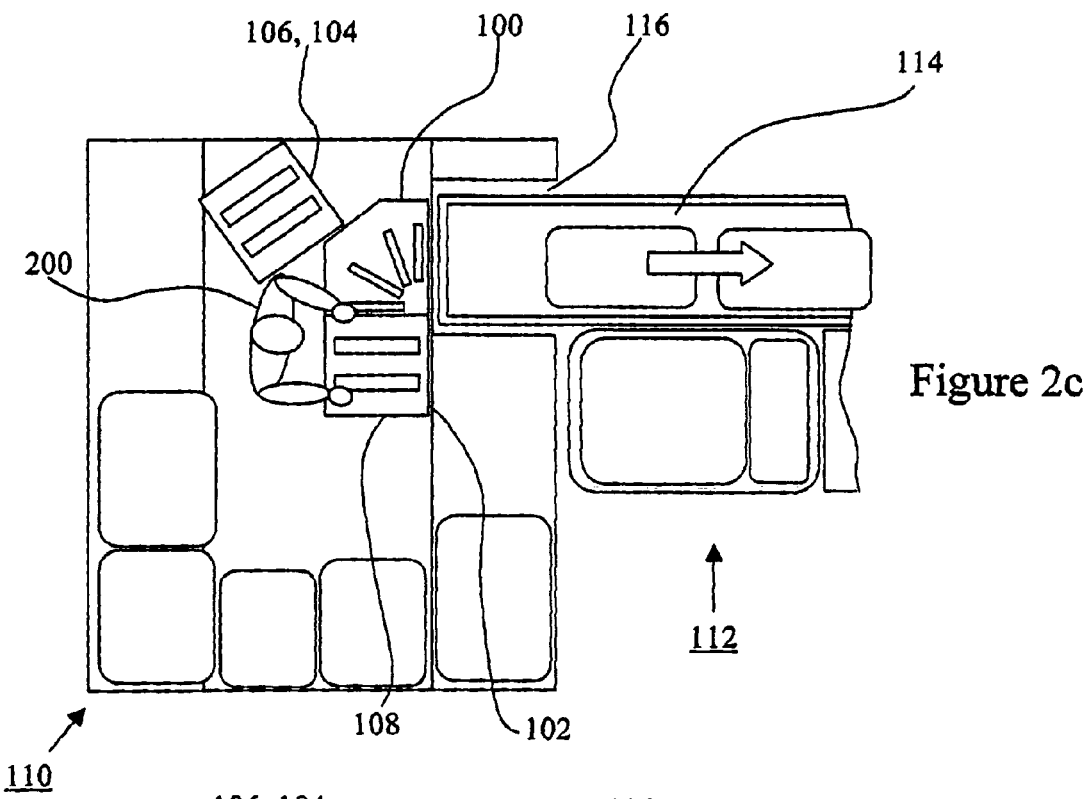
FIG. 2c is a diagrammatic top view showing another step of a method for handling baggage using the conveyor system of FIG. 1.

Referring now to FIG. 2c, the baggage handler 200 is shown assembling the conveyor unit 102 into the exposed portion of the floor 108 adjacent the conveyor unit 100. The baggage handler 200 has removed the conveyor unit 102 from the top of the stack of stowed conveyor units, and either placed the conveyor unit 102 adjacent the conveyor unit 100, or coupled the conveyor unit 102 to the conveyor unit 100. Advantageously, the conveyor path within the lower cargo compartment is extended in a direction toward the remaining baggage items to be unloaded, thereby requiring the baggage handler to perform less lifting, twisting and other manual baggage handling steps that may result in injury. Further advantageously, the same baggage handler that is unloading the cargo compartment 110 also couples the conveyor unit 102 to the conveyor unit 100, such that no additional baggage items are loaded onto the conveyor path while the conveyor units are being coupled together.

Figure 2D:
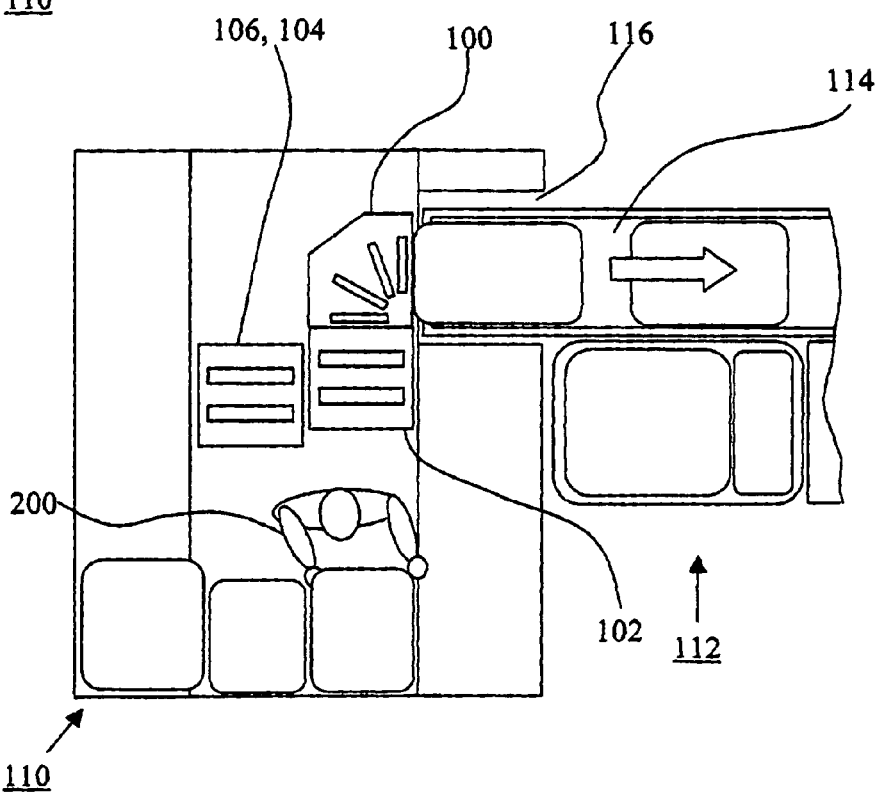
FIG. 2d is a diagrammatic top view showing another step of a method for handling baggage using the conveyor system of FIG. 1.

Referring now to FIG. 2d, the baggage handler 200 is shown placing additional baggage items onto the conveyor path, which extends from conveyor unit 102 toward the opening 116. The baggage handler 200 has pulled along the stack of remaining conveyor units 104, 106 to a convenient location near the terminal end of the conveyor path. In this way, the next conveyor unit is always readily accessible to the baggage handler 200.

Figure 2E:
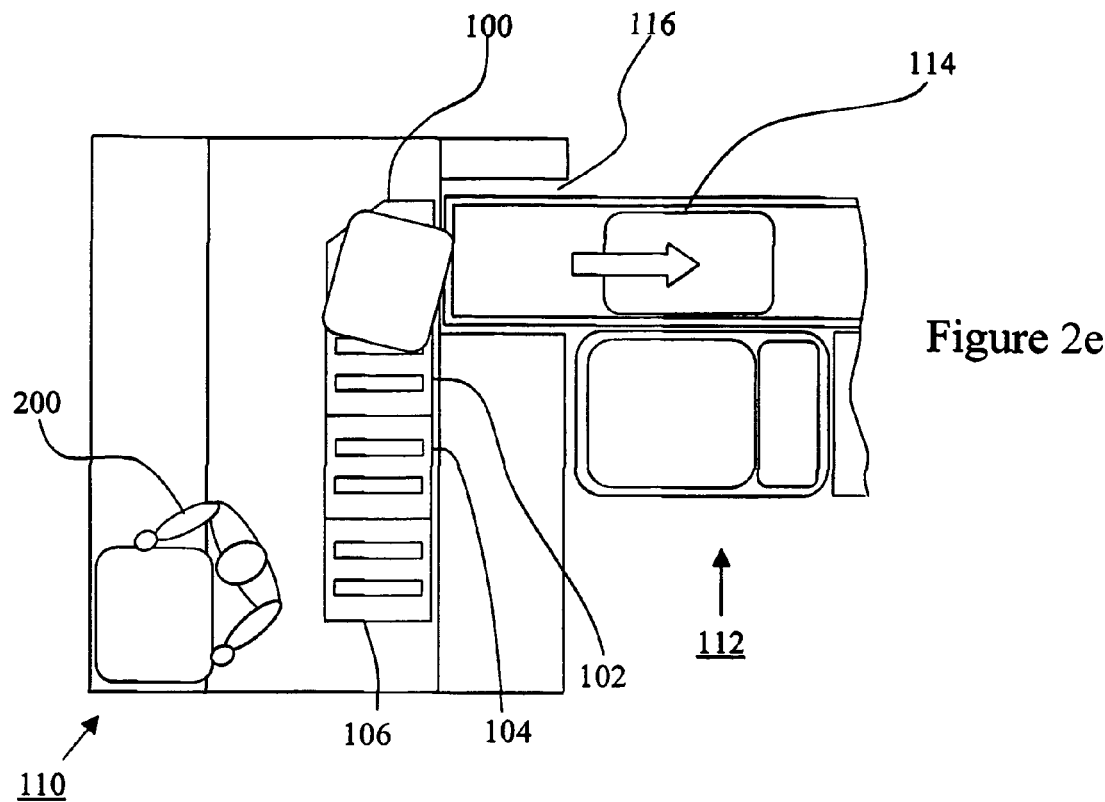
FIG. 2e is a diagrammatic top view showing another step of a method for handling baggage using the conveyor system of FIG. 1.

Referring now to FIG. 2e, the cargo compartment 110 is nearly unloaded and the remaining conveyor units 104, 106 are shown in place, adjacent the conveyor unit 102. Baggage items continue to be placed onto and directed along the conveyor path toward the opening 116.

Figure 2F:
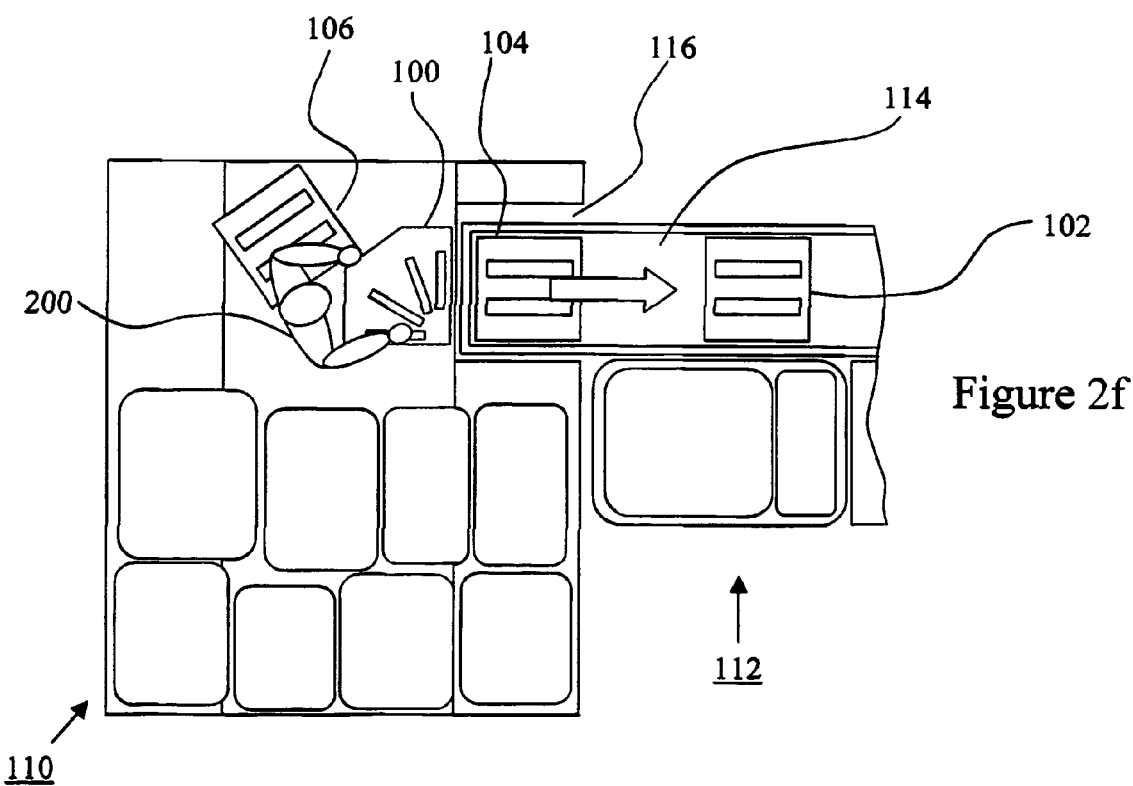
FIG. 2f is a diagrammatic top view showing another step of a method for handling baggage using the conveyor system of FIG. 1.

Referring now to FIG. 2f, shown is the baggage handler passing the conveyor units 102, 104 down the conveyor ramp 114 subsequent to the cargo compartment being loaded with baggage items. For instance, FIG. 2f illustrates the last steps of baggage handling for a "turn-around" flight in which several intermediate steps between FIG. 2e and FIG. 2f have been omitted in the interest of brevity. For completeness, some of the omitted steps include the baggage handler 200 receiving baggage that has passed up the conveyor ramp 114 and along the conveyor path defined by conveyor units 100, 102, 104 and 106. As the baggage was stacked at the back of the cargo compartment 110, the baggage handler 200 removed successive conveyor units 106, 104 and 102. The conveyor units 104 and 102 were stacked on top of the conveyor unit 106, and the entire stack was pushed back toward the opening 116 as the cargo compartment filled up with baggage. The baggage handler 200 has removed conveyor units 102 and 104 from the top of the stack, and is passing these units down the conveyor ramp 114 as shown in FIG. 2f. Next, the baggage handler 200 will pass down the conveyor units 106 and 100, then will exit and secure the cargo compartment 110. Optionally, additional baggage items will be loaded into the cargo compartment 110 using only the conveyor ramp 114, subsequent to all of the conveyor units being removed.

Optionally, a closed circuit TV system is provided for displaying an image of the inside of the cargo compartment 110 to a not illustrated baggage handler proximate the bottom of the conveyor ramp 114. In this way, the not illustrated baggage handler may view the inside of the cargo compartment 110 and judge the rate at which additional baggage items should be sent up the conveyor ramp 114. Accordingly, if it appears that the baggage handler 200 is about to decouple one of the conveyor units from the conveyor path, then the not illustrated baggage handler may interrupt or reduce the flow rate of baggage items into the cargo compartment, so as to afford the baggage handler sufficient time to complete the decoupling operation.

Figure 3A:
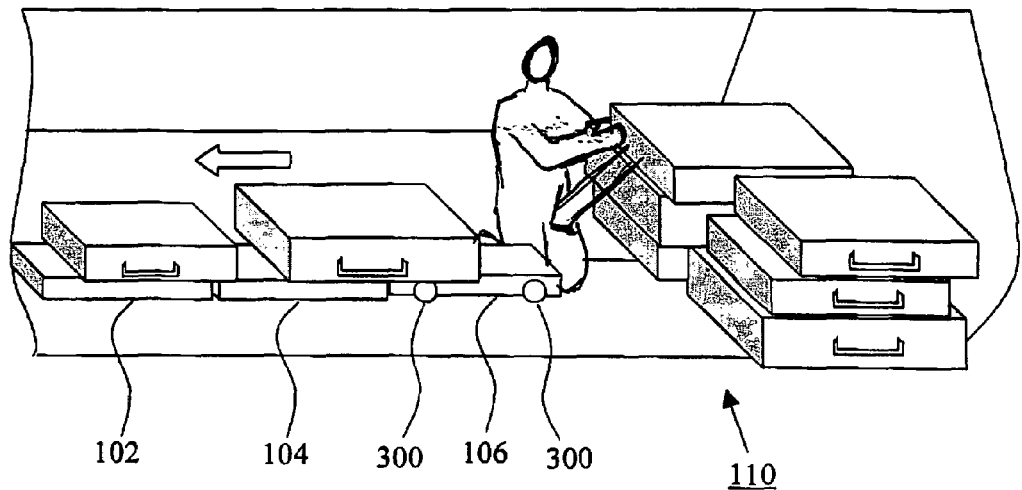
FIG. 3a is a diagrammatic view showing baggage being unloaded using a conveyor system according to an embodiment of the instant invention.

Referring now to FIG. 3a, shown is a diagrammatic view of baggage being unloaded using a conveyor system according to an embodiment of the instant invention. The baggage handler 200, shown in a kneeling position, lifts baggage items off the top of the stack and places the baggage items onto a conveyor path, which is only partially shown in FIG. 3a. Baggage items are conveyed along the conveyor path toward the forward portion of cargo compartment 110. As is shown in FIG. 3a, in one embodiment the conveyor unit 106 is the terminal unit of the conveyor path, such that the conveyor path is substantially horizontal along its entire length. Also shown in FIG. 3a is a plurality of wheels 300 disposed along the lower surface of conveyor unit 106. As discussed above, the conveyor unit 106 serves as the wheeled base of a stack of conveyor units for supporting easy movement of the conveyor units within the cargo compartment 110, when the conveyor units are not in use.

Figure 3B:
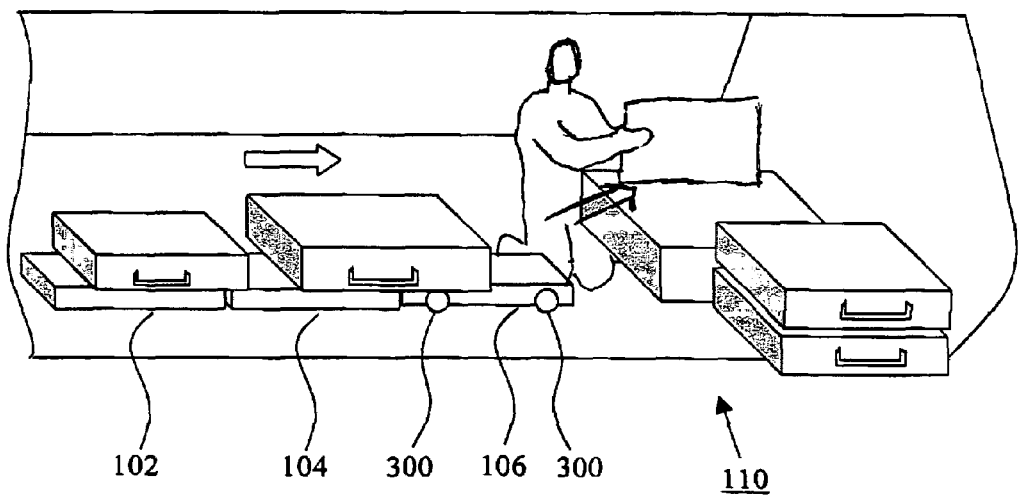
FIG. 3b is a diagrammatic view showing baggage being loaded using a conveyor system according to an embodiment of the instant invention.

Referring now to FIG. 3b, shown is a diagrammatic view of baggage being loaded using a conveyor system according to an embodiment of the instant invention. As is the case in FIG. 3a, baggage items are conveyed along a substantially horizontal conveyor path, and some manual lifting or manipulation of the baggage is required in order to place the baggage onto a stack once the baggage reaches the end of the conveyor path near the aft portion of cargo compartment 110. For instance, the baggage handler 200 lifts the baggage while in a kneeling position, as is shown in the figure.

Figure 4A:
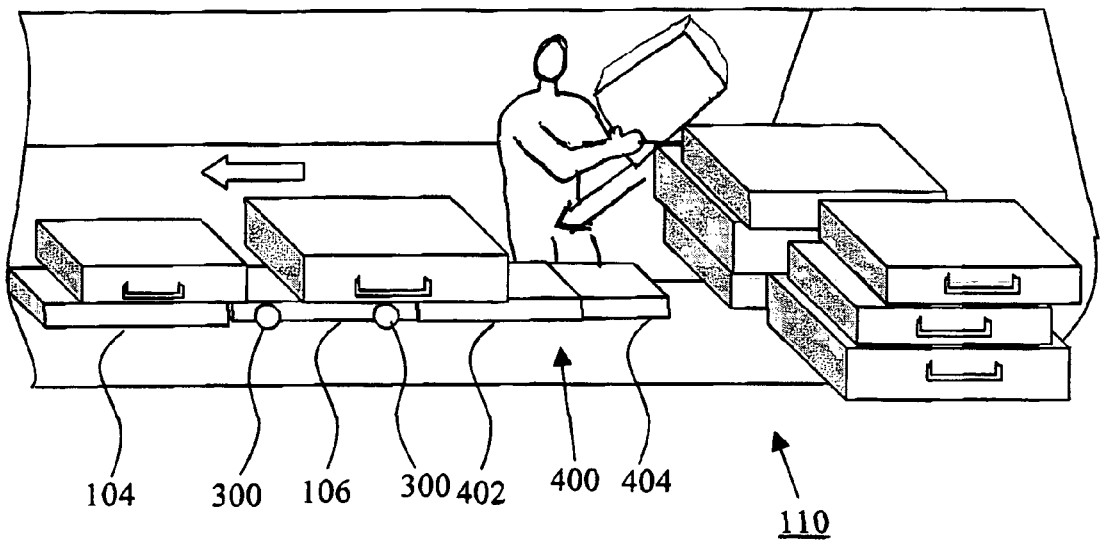
FIG. 4a is a diagrammatic view showing baggage being unloaded using a conveyor system and ramp unit according to an embodiment of the instant invention.

Referring now to FIG. 4a, shown is a diagrammatic view of baggage being unloaded using a conveyor system including a ramp unit according to an embodiment of the instant invention. The baggage handler 200, shown in a kneeling position, lifts baggage items off the top of the stack and places the baggage items onto a conveyor path, which is only partially shown in FIG. 4a. Baggage items are conveyed along the conveyor path toward the forward portion of cargo compartment 110. As is shown in FIG. 4a. a ramp unit 400 is the terminal unit of the conveyor path. The ramp unit 400 comprises a rearwardly journalled conveyor flap 402, which is adjustable between at least a horizontal position and an inclined position. Preferably, the conveyor flap 402 is adjustable between more than two positions, and more preferably the conveyor flap 402 is continuously adjustable between the horizontal position and the inclined position. The conveyor flap 402 comprises an endless conveyor belt received, in a manner not described in greater detail, in a not illustrated frame. Optionally, the ramp unit 400 includes a terminal platform 404, which remains substantially horizontal regardless of the orientation of the conveyor flap 402. During use, conveyor units such as for instance conveyor unit 104 are inserted and removed from between the not illustrated angled conveyor unit 100 and the ramp unit 400. In this way, the length of the conveyor path is variable whilst ensuring that the ramp unit is the terminal element of the conveyor path. Optionally, the ramp unit 400 is configured such that either end of the conveyor flap 402 is inclinable.

Figure 4B:
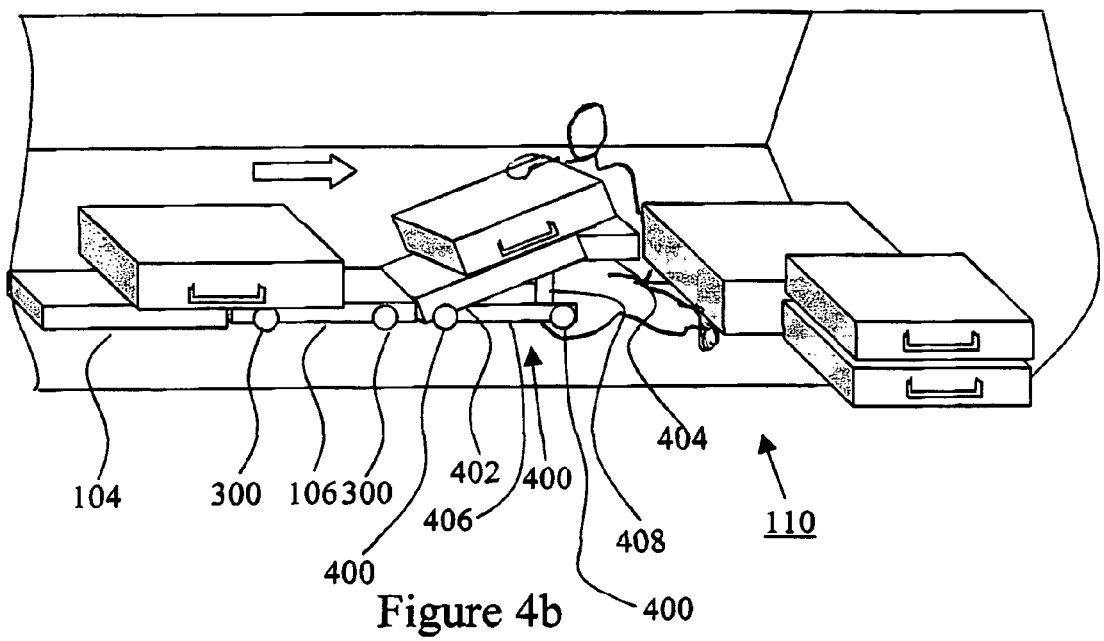
FIG. 4b is a diagrammatic view showing baggage being loaded using a conveyor system and ramp unit according to an embodiment of the instant invention.

Referring now to FIG. 4b, shown is a diagrammatic view of baggage being loaded using a conveyor system and ramp unit according to an embodiment of the instant invention. As is the case in FIG. 4a. baggage items are conveyed along a substantially horizontal conveyor path, but at the end of the conveyor path the baggage items are directed upwards along the ramp unit 400. In this way, at least some of the manual lifting or manipulation of the baggage is eliminated. As is shown more clearly in FIG. 4b, the conveyor flap 402 is pivotally journalled on a support member 406, which preferably is arranged on wheels 400. At least a jack 408 is arranged between the conveyor flap 402 and the support member 406, said jack allowing an adjustment of the conveyor flap 402 in a position with a desired inclination. At the front, the conveyor flap 402 preferably is provided with a pivotally journalled terminal platform 404. Preferably, the terminal platform 404 is associated with a continuous conveyor belt. Preferably, the terminal platform 404 can be set with a desired inclination relative to the conveyor flap 402. For instance, the terminal platform 404 is advantageously positioned in a horizontal plane when the conveyor flap 402 is arranged with a predetermined inclination relative to the conveying direction of the remaining conveying units. During use, the baggage handler 200 simply guides the baggage items off of the terminal platform 404 and onto the top of the stack of baggage items.

Optionally, each one of the conveyor units 102, 104, 106 is replaced with a ramp unit 400, such that each conveyor unit of the conveyor path in FIGS. 4a and 4b is inclinable. Accordingly, any one of the conveyor units may operate as a terminal unit, since all conveyor units are functionally identical. Advantageously, the baggage handler 200 may add and remove units from the end of the conveyor path farthest from the opening 116, without having to shift the entire conveyor path in one direction or the other. Optionally, the ramp unit 400 is configured such that either end of the conveyor flap 402 is inclinable.

Figure 4C:
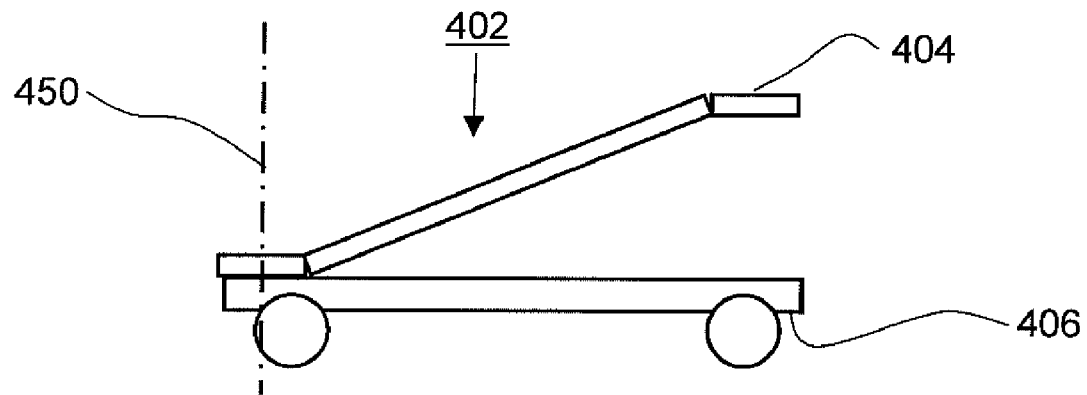
FIG. 4c is a simplified side view showing an optional conveyor flap configuration, which supports pivoting about a vertical axis of the conveyor flap relative to the support member.
Figure 4D:
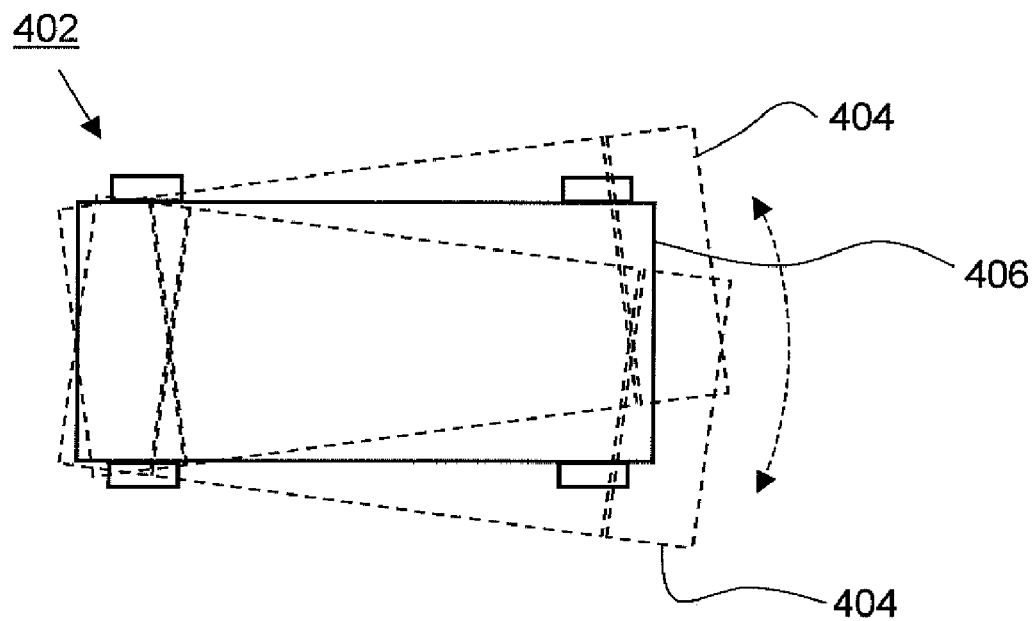
FIG. 4d is a simplified top view showing the conveyor flap of FIG. 4c.

Further optionally, as is shown in FIGS. 4c and 4d, the conveyor flap 402 is also pivotable relative to the support member 406 about a vertical axis 450 that passes through a point proximate the rearward edge of the conveyor flap 402, such that the entire conveyor flap including the optional terminal platform 404 may be selectively directed to one side of the support member 406, or the other.

Figure 5A:
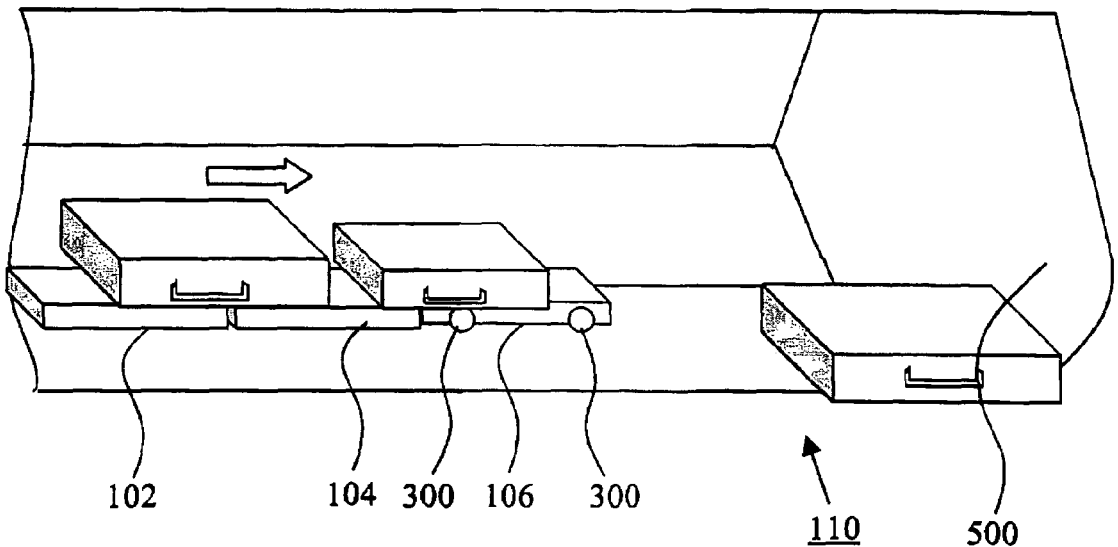
FIG. 5a is a diagrammatic view showing an early stage of baggage being loaded using a conveyor system according to an embodiment of the instant invention.
Figure 5B:
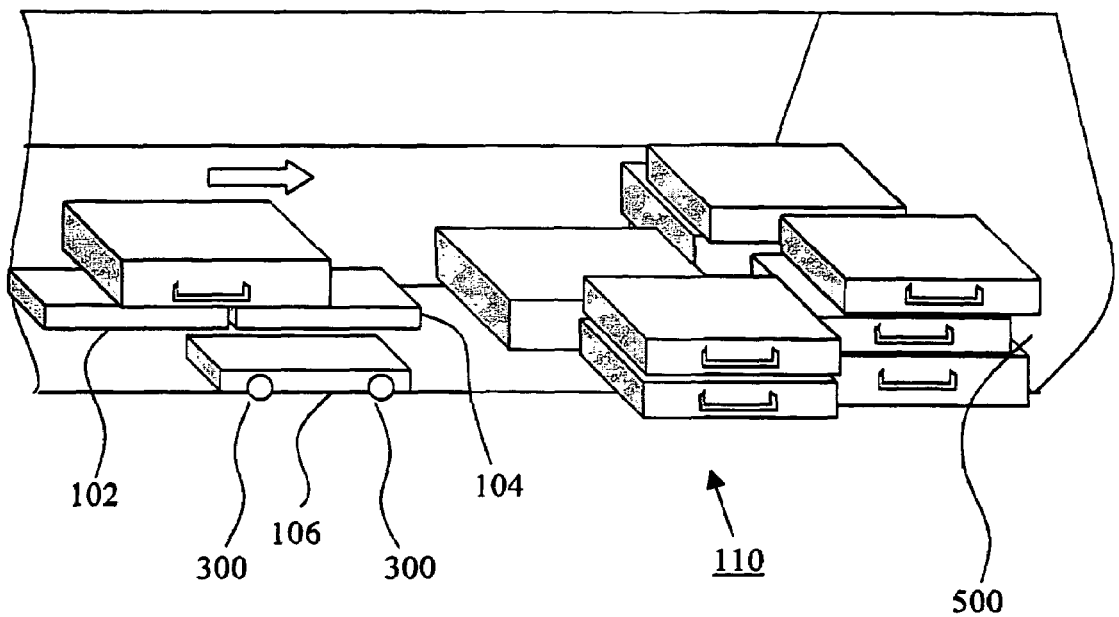
FIG. 5b is a diagrammatic view showing an intermediate stage of baggage being loaded using a conveyor system according to an embodiment of the instant invention.
Figure 5C:
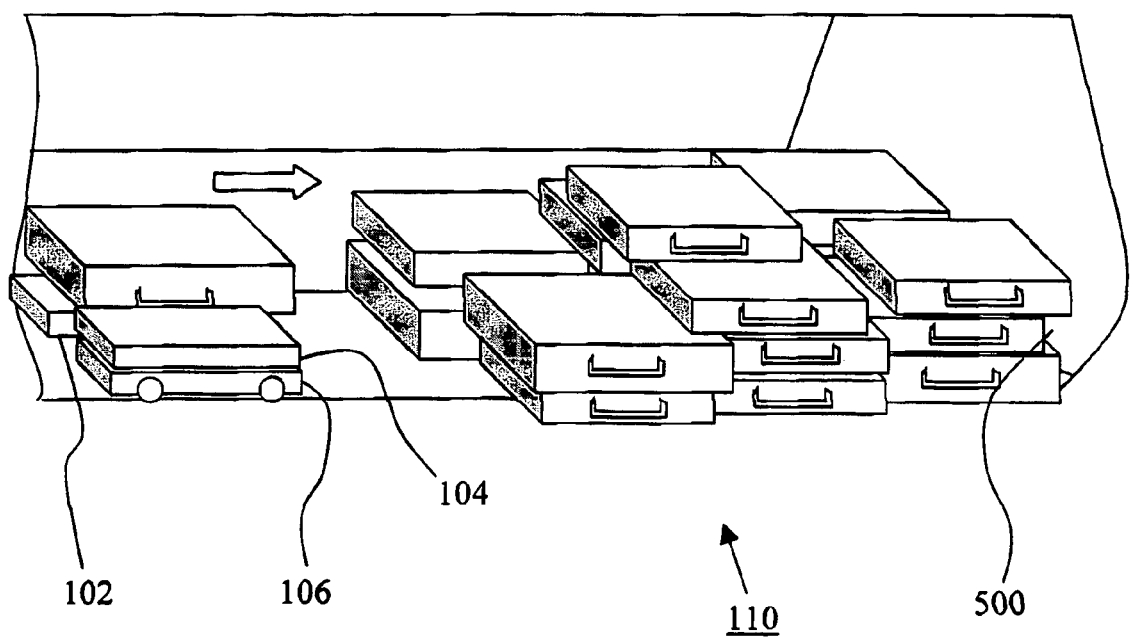
FIG. 5c is a diagrammatic view showing a late stage of baggage being loaded using a conveyor system according to an embodiment of the instant invention.

Referring now to FIGS. 5a through 5c, shown are diagrammatic views of early, intermediate and late stages of baggage being loaded using a conveyor system according to an embodiment of the instant invention. The baggage handler has been omitted in FIGS. 5a through 5c for improved clarity. In FIG. 5a, the conveyor units 102, 104 and 106 are in an assembled condition so as to provide a conveyor path between not illustrated angled conveyor unit 100 and the aft portion of the cargo compartment 110. During the early stage of baggage being loaded, the items of baggage are conveyed into the cargo compartment and are stacked near a back wall 500 of the cargo compartment 110. All of the conveyor units are being used in FIG. 5a, such that the conveyor path reaches substantially to the back wall 500.

FIG. 5b shows an intermediate stage of baggage being loaded. As the baggage items are stacked further from the back wall 500, the terminal conveyor unit 106 is removed from the conveyor path and is stowed in a position adjacent the other conveyor units.

FIG. 5c shows a late stage of baggage being loaded. During the late stage, baggage is being stacked even further from the back wall 500, and the conveyor unit 104 has been removed from the conveyor path and stacked on top of the conveyor unit 106, so as to accommodate stacking of the baggage. In this way, the baggage handler may work from the back wall 500 toward the not illustrated opening of the cargo compartment 110, removing conveyor units so as to open up space as the baggage items are stacked progressively further from the back wall 500.

Figure 6A:
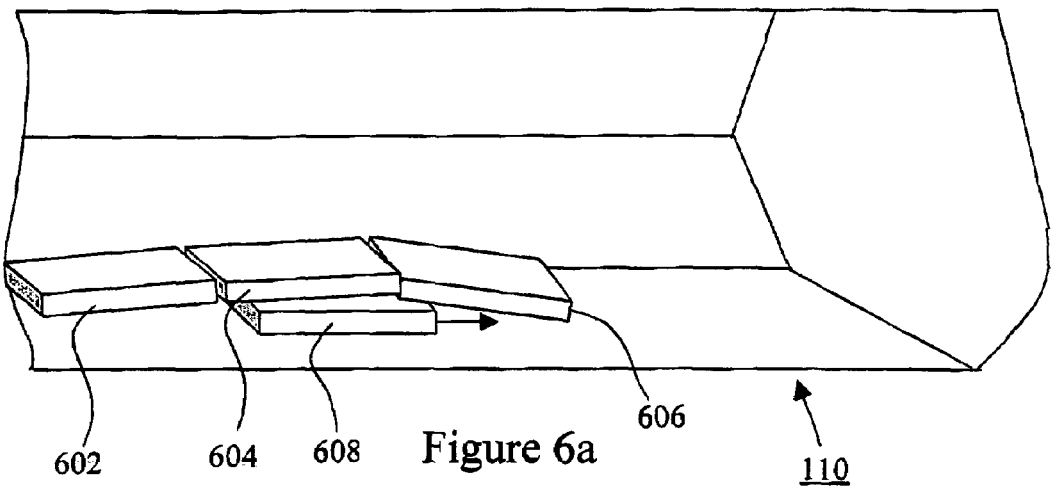
FIG. 6a is a diagrammatic view showing a conveyor unit advancing beneath a conveyor system according to an embodiment of the instant invention.
Figure 6B:
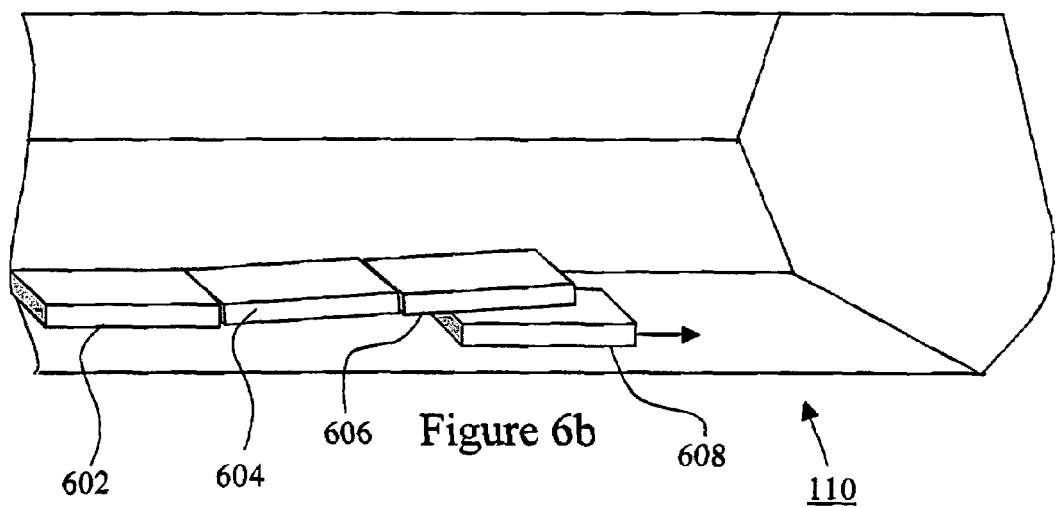
FIG. 6b is a diagrammatic view showing a conveyor unit emerging from beneath a conveyor system according to an embodiment of the instant invention.
Figure 6C:
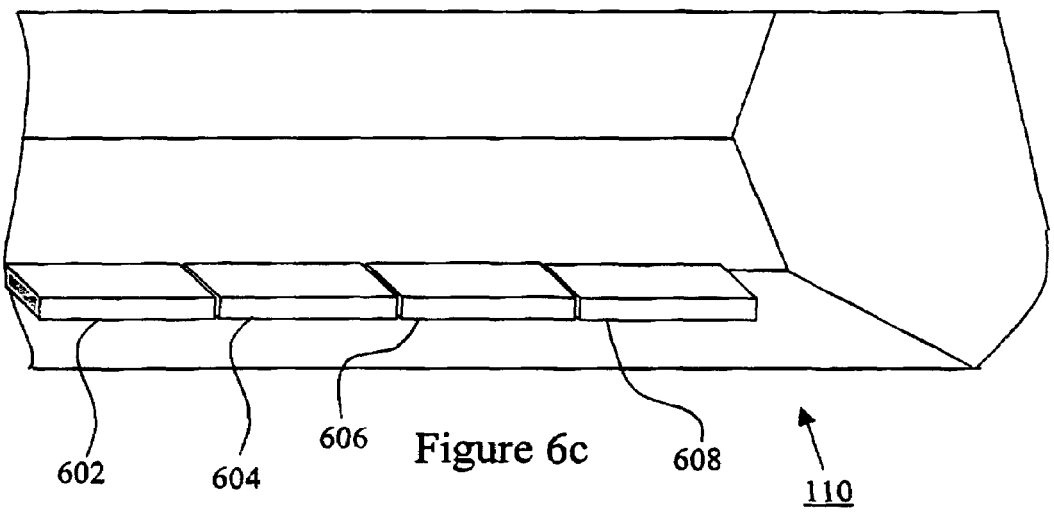
FIG. 6c is a diagrammatic view showing a conveyor unit in place, after being extracted from beneath a conveyor system according to an embodiment of the instant invention.

Referring to FIGS. 6a through 6c, shown are diagrammatic views of a conveyor unit advancing beneath a conveyor system according to an embodiment of the instant invention. Advancing the conveyor units in the manner shown in FIGS. 6a through 6c allows the conveyor units to be provided into the cargo compartment 110 when they are needed, without the need to store conveyor units within the cramped space of the cargo compartment 110 when not in use. Advantageously, the lower surface of the conveyor path moves in a direction opposite the upper surface, so that the conveyor units may be advanced against the flow of baggage items. This eliminates the need to reverse the direction of the conveyor units, and thereby interrupt the flow of baggage items, in order to provide additional conveyor units into the cargo compartment 110 during unloading. Similarly, during baggage loading the modules that are removed from the conveyor path may be advanced beneath the conveyor path toward and out of the not illustrated opening of the cargo compartment 110. This eliminates the need to reverse the direction of the conveyor units, and thereby interrupt the flow of baggage items, in order to remove excess conveyor units from the cargo compartment 110 during loading.

As shown in FIG. 6a, a conveyor path including conveyor units 602, 604 and 606 is assembled within the cargo compartment 110. A conveyor unit 608 is advancing beneath the conveyor path, elevating the other conveyor units as it passes therebeneath. The undersides of conveyor units 602, 604 and 606 are adapted to engage other conveyor units, such as for instance conveyor unit 608, and to advance the other conveyor units along a direction opposite the flow of baggage items.

As shown in FIG. 6b, the conveyor unit 608 advances to the end of the conveyor path, and the remaining conveyor units settle back down onto the floor surface of the conveyor compartment after the conveyor unit 608 passes by.

As shown in FIG. 6c, the conveyor unit 608 is completely extracted from beneath the conveyor path and is assembled into place adjacent the conveyor unit 606. Optionally, the conveyor unit 608 is coupled automatically to the conveyor unit 608 or a not illustrated baggage handler couples the conveyor unit 608 to the conveyor unit 606 in a manual fashion, after the conveyor unit 608 is extracted from beneath the conveyor path.

Optionally, provided the conveyor units are made thin enough, the conveyor units are advanced under other conveyor units without the need to have the other conveyor units rise up off the floor surface. For instance, each conveyor unit is supported above the floor using a collapsible frame. When extended, the frame supports the conveyor unit above the floor and provides sufficient space to allow another conveyor unit to pass there-below. When the other conveyor unit is extracted from the end of the conveyor path, its frame is extended and it is coupled to the end of the conveyor path in a manner as described above.

Referring now to FIGS. 7a through 7d, shown are diagrammatic views of an alternate scheme of inserting and removing conveyor units according to an embodiment of the instant invention. Unlike the other embodiments described above, FIGS. 7a through 7d show a conveyor unit being inserted between the angled conveyor unit 700 and a conveyor unit 702. Accordingly, the terminal conveyor unit 704, which optionally is provided in the form of a ramp unit, is always disposed at the end of the conveyor path.

Figure 7A:
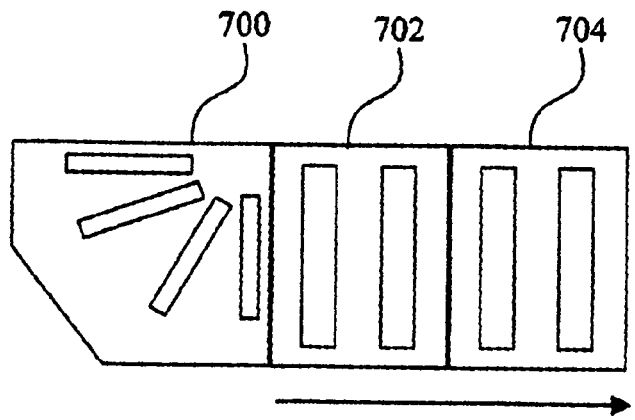
FIG. 7a is a diagrammatic view showing two conveyor units adjacent an angled conveyor unit of a conveyor system according to an embodiment of the instant invention.

As shown in FIG. 7a, two conveyor units 702 and 704 are assembled adjacent to the angled conveyor unit 700. In particular, the conveyor unit 704 is the terminal conveyor unit and the conveyor unit 702 is disposed intermediate the conveyor units 700 and 704. The arrow indicates direction of travel of the two conveyor units 702 and 704 when a new conveyor unit is being inserted. Preferably, the two conveyor units 702 and 704 have wheels arranged along the lower surfaces thereof so as to facilitate their movement to open a space adjacent to the angled conveyor unit 700.

Figure 7B:
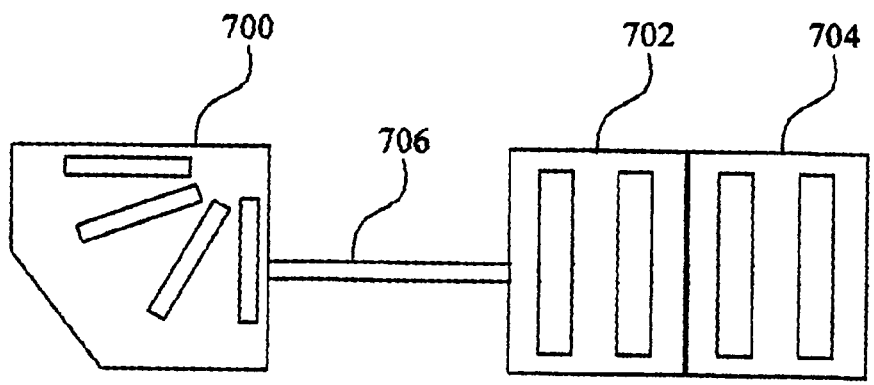
FIG. 7b is a diagrammatic view showing a space opened up between the two conveyor units and the angled conveyor unit of a conveyor system according to an embodiment of the instant invention.

Referring now to FIG. 7b, the two conveyor units 702 and 704 have been moved to the right in the figure to open up a space adjacent the angled conveyor unit 700. A guide rail 706 associated with angled conveyor unit 700 has also been exposed. The guide rail, or optionally a plurality of guide rails, maintains alignment and serves as a guide for spacing the conveyor unit 702 from the angled conveyor unit 700 when a new conveyor unit is being inserted.

Figure 7C:
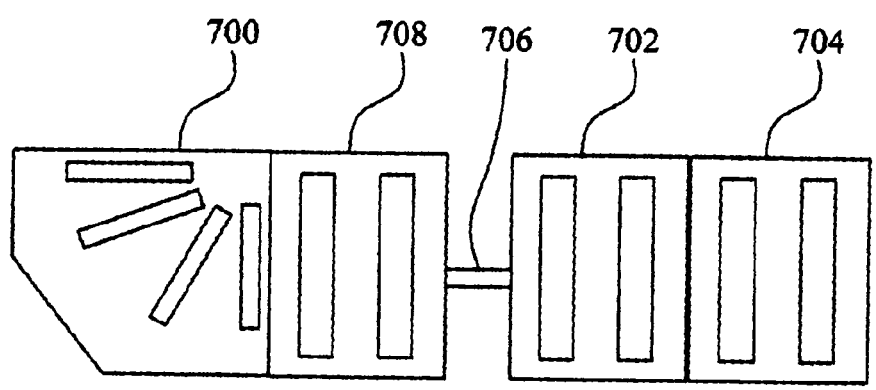
FIG. 7c is a diagrammatic view showing a third conveyor unit within the space opened up between the two conveyor units and the angled conveyor unit of a conveyor system according to an embodiment of the instant invention.

Referring now to FIG. 7c, a new conveyor unit 708 is inserted intermediate the angled conveyor unit 700 and the conveyor unit 702. As shown in the figure, the space that was opened up preferably is larger than the minimum amount of space that is required to accommodate the new conveyor unit 708. However, the extra space is exaggerated in FIG. 7c for the purpose of illustrating the operating concepts. Preferably, the new conveyor unit 708 is detachably coupled to the angled conveyor unit 700.

Figure 7D:
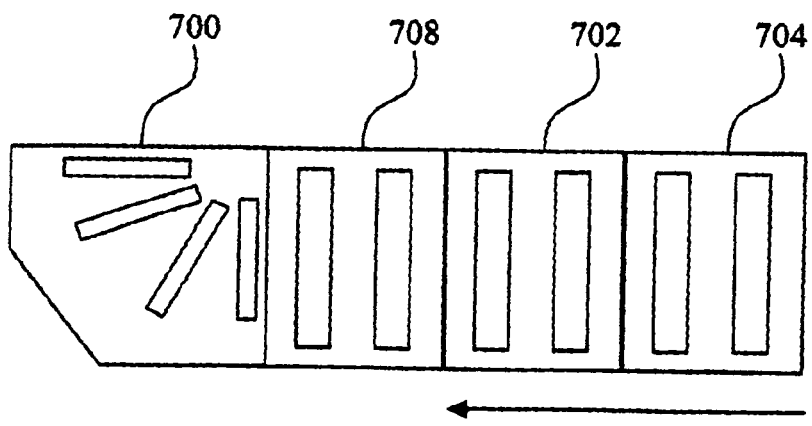
FIG. 7d is a diagrammatic view showing three conveyor units adjacent an angled conveyor unit of a conveyor system according to an embodiment of the instant invention.

Referring now to FIG. 7d, the two conveyor units 702 and 704 have been moved to the left in the figure to close the extra space between the new conveyor unit 708 and the conveyor unit 702.

Figure 8A:
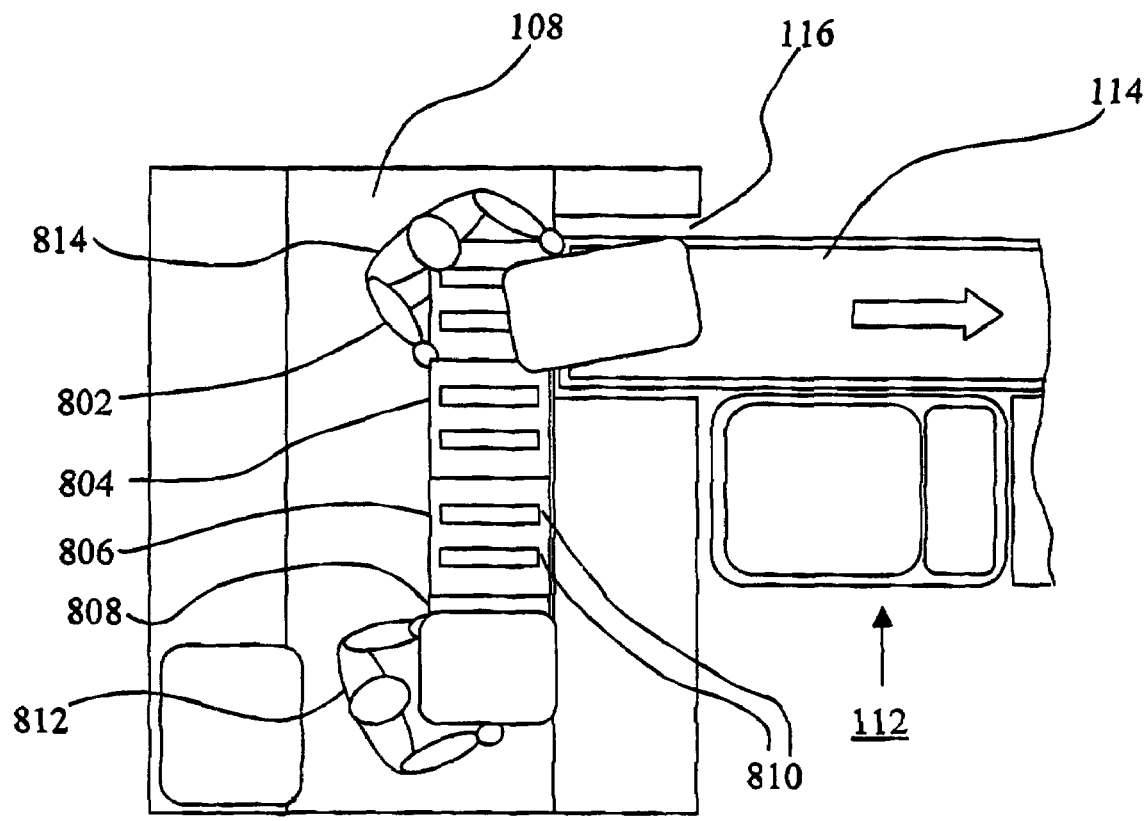
FIG. 8a is a diagrammatic top view of another conveyor system according to an embodiment of the instant invention, shown in an assembled condition within a cargo compartment of an aircraft.

Referring now to FIG. 8a, a conveyor system according to another embodiment of the instant invention is shown in diagrammatic top view in an assembled condition within a cargo compartment of an aircraft. The conveyor system includes a plurality of conveyor units 802, 804, 806 and 808 disposed in an end-to-end arrangement so as to define a conveyor path along a floor surface 108 of an aircraft lower cargo compartment 110. Also shown in FIG. 8a is a standard belt loader 112 having a conveyor ramp 114, the inclination of which is adjustable for being aligned with opening 116 of the cargo compartment 110. According to the instant embodiment, the conveyor units 802, 804, 806 and 808 are provided in the form of linear conveyor units. Preferably, each conveyor unit 802, 804, 806 and 808 includes a plurality of rollers 810 for engaging a lower surface of baggage items passing there above. By way of non-limiting example, each conveyor unit 802, 804, 806 and 808 is shown with two rollers 810. Preferably, at least one roller of each conveyor unit 802, 804, 806 and 808 is powered, but optionally at least some of the conveyor units 802, 804, 806 and 808 do not include a powered roller. Optionally, at least some of the conveyor units 802, 804, 806 and 808 includes a number of rollers that is greater than 2. Further optionally, the conveyor units 802, 804, 806 and 808 are provided in the form of a not illustrated continuous belt conveyor, or in another known form that is suitable for conveying items of baggage such as for example a slider belt conveyor, a gravity conveyor, a skatewheel conveyor or a ball transfer table. For instance, a slider belt conveyor includes a plurality of parallel belts arranged one beside another between two rollers. A slider belt conveyor, including a plurality of parallel belts each having a length that is at least one and a half times their width, facilitates tracking over the relatively short conveying distance that is envisaged for each conveyor unit. Optionally, the slider bed over which the plurality of parallel belts slide is fabricated using ultra-high molecular weight plastic. Further optionally, the belts of the plurality of belts are circular in cross-section.

According to the instant embodiment there is no angled conveyor unit. Rather, the conveyor path is made up entirely of linear conveyor units. As shown in FIG. 8a, one baggage handler 812 moves the baggage items onto or off of the conveyor path proximate the conveyor unit 808, whist a second baggage handler 814 oversees movement of the baggage items between the conveyor unit 802 and the conveyor ramp 114, including negotiating the 90° corner as the baggage items pass through the opening 116. Optionally, a right-angle transfer between conveyor unit 802 and the conveyor ramp 114 is provided such that baggage items moving along one of the conveyor unit 802 and the conveyor ramp 114 drop onto the other one of the conveyor unit 802 and the conveyor ramp 114 with a concomitant change in conveying direction. For instance, during a loading operation the end of the conveyor ramp 114 is positioned elevationally above the conveyor unit 802 such that baggage items drop from the conveyor ramp 114 onto the conveyor unit 802. During unloading, optionally the conveyor unit 802 is provided in the form of a ramp unit having a conveyor flap that is inclinable in either direction, such that baggage items moving along the conveyor path are conveyed elevationally upward along the inclined conveyor flap and then drop down onto the conveyor ramp 114, which is optionally extended into the cargo compartment 110 via the opening 116. Further optionally, an additional conveyor unit is provided adjacent the opening 116 for receiving baggage items that drop off the inclined conveyor flap. The additional conveyor unit is for conveying the received baggage items along a second conveyor path that is transverse to the conveyor path and that is generally aligned with the conveyor ramp 114. The use of a right-angle transfer eliminates the need for the baggage handler 814 inside the cargo compartment 110.

During use, the conveying speed and direction of the conveyor units 100, 102 etc. are synchronized one-to-the-other, and are synchronized to the conveying speed and direction of conveyor ramp 114. Optionally, the conveyor units 802, 804, 806 and 808 are secured to the floor using a not illustrated suction-cup or other securing device disposed along a lower surface thereof. Preferably, each conveyor unit 802, 804, 806 and 808 is detachably connected to an adjacent conveyor unit. Optionally, the conveyor units 802, 804, 806 and 808 are simply placed in an end-to-end arrangement without being coupled together or otherwise secured in place.

As discussed above, it is preferable that each of the conveyor unit 802, 804, 806 and 808 include at least one roller that is powered. Optionally, each conveyor unit that includes a powered roller also includes an autonomous power source, such as for instance a rechargeable battery, for powering the powered roller. Further optionally, when the conveyor units 802, 804, 806 and 808 are detachably coupled one to the other, an electrical connection is established that provides power to the coupled conveyor units from a centralized power source, such as for instance a rechargeable battery of the conveyor unit 802 or another power source located outside the cargo compartment 110.

Preferably, not illustrated controls are provided for allowing a user, such as for instance a baggage handler, to control and vary the conveying direction, conveying speed, and to switch the conveyor system on and off. By way of a non-limiting example, at least one of the conveyor units 802, 804, 806 and 808 includes a control panel that is accessible by the baggage handler. Alternatively, the baggage handler carries a remote control device through the cargo compartment 110. Optionally, the remote control device is wireless.

Of course, any of the above-mentioned methods for adding and removing the conveyor units during unloading and loading may be used with the embodiment described with reference to FIG. 8a.

Figure 8B:
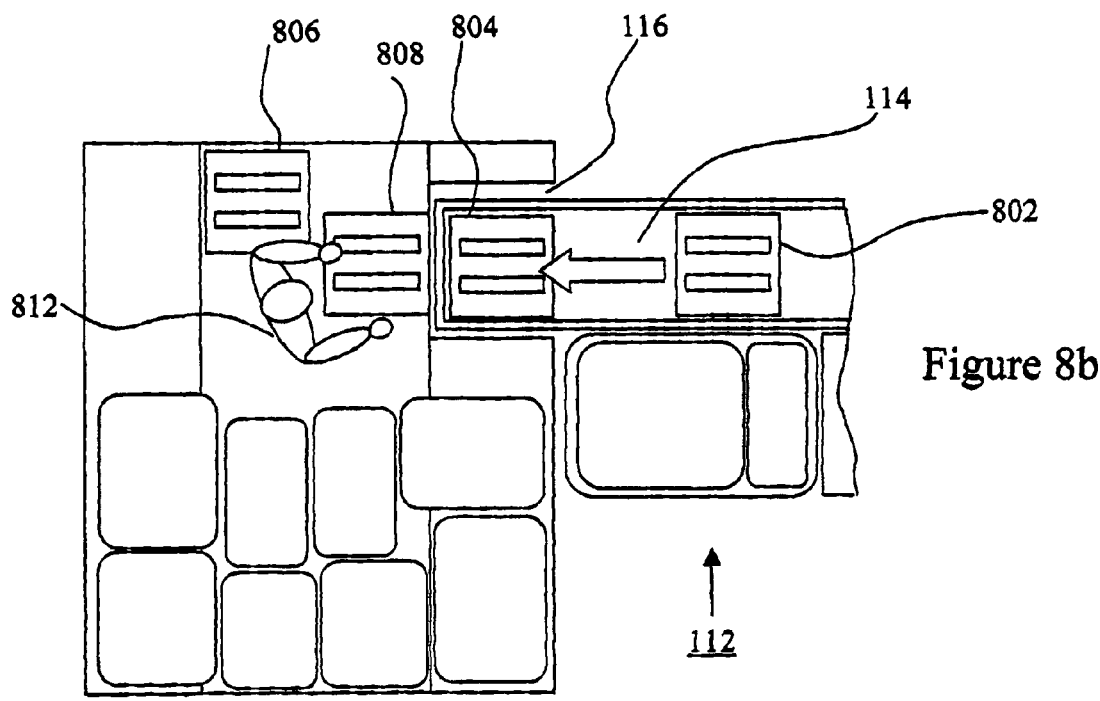

Referring now to FIGS. 8b through 8e, shown are diagrammatic top views of steps of a method for handling baggage using the conveyor system of FIG. 8a. In FIG. 8b, a baggage handler 812 is shown inside the lower cargo compartment 110. The conveyor ramp 114 is shown conveying items, specifically the conveyor units 802 and 804, into the cargo compartment 110 via the opening 116. As such, the conveyor ramp 114 is operating initially in a direction opposite the direction that is required for unloading baggage from the cargo compartment 110, as is indicated in the figure using a block arrow. The conveyor unit 808 is shown already in place adjacent the opening 116. In addition, the conveyor unit 806 is shown in a stowed position within the cargo compartment 110, close to the opening 116. Preferably the conveyor units 802, 804, 806 and 808 are functionally identical.

For most efficient operation, all conveyor units that are required for handling the baggage are conveyed into the cargo compartment 110 prior to any of the baggage being unloaded from the cargo compartment 110. Of course, in instances where there is insufficient room within the cargo compartment 110 to accommodate both the baggage handler 812 and the conveyor units 802, 804, 806 and 808, less efficient operation is still achieved by unloading some of the baggage near the opening 116 and then reversing the direction of conveyor ramp 114 to convey the conveyor units into the cargo compartment via the opening 116.

Figure 8C:
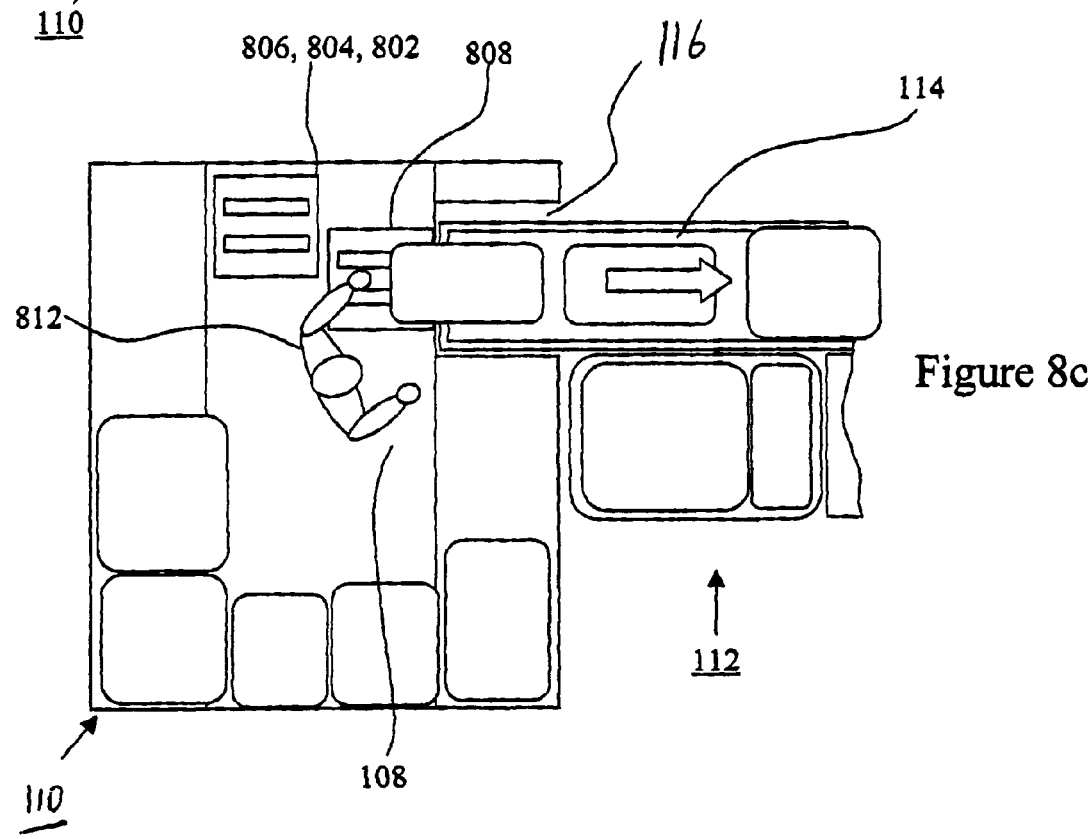

Referring now to FIG. 8c, the conveyor units 802, 804 and 806 are shown in a stacked arrangement close to the opening 116, and out of the way of the baggage handler 812. Items of baggage are being conveyed down the conveyor ramp 114, as indicated in the figure by the block arrow. As the baggage handler 812 continues to transfer baggage onto the conveyor unit 808 and subsequently down the conveyor ramp 114, a portion of the floor 108 adjacent the conveyor unit 808 is exposed.

Figure 8D:
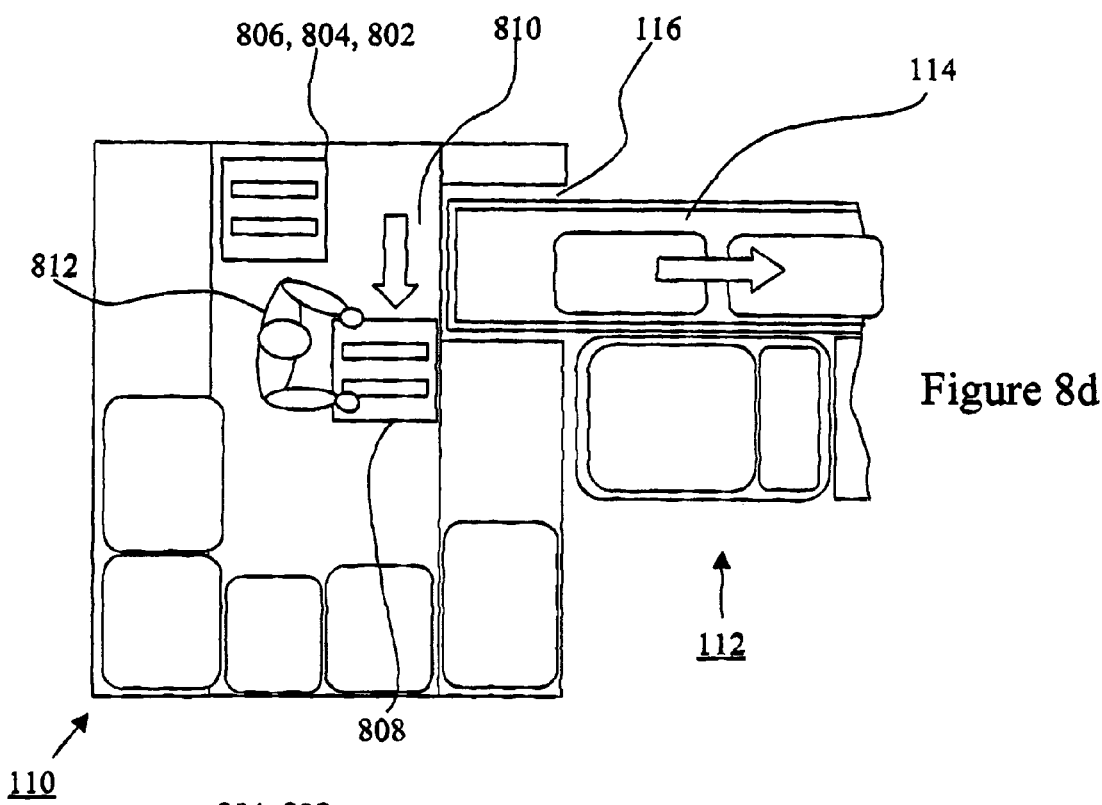

Referring now to FIG. 8d, the baggage handler 812 is shown translating the conveyor unit 808 into the portion of the floor 108, as indicated by the block arrow. In this way, the baggage handler 812 exposes a different portion of floor 810 proximate the opening 116.

Figure 8E:
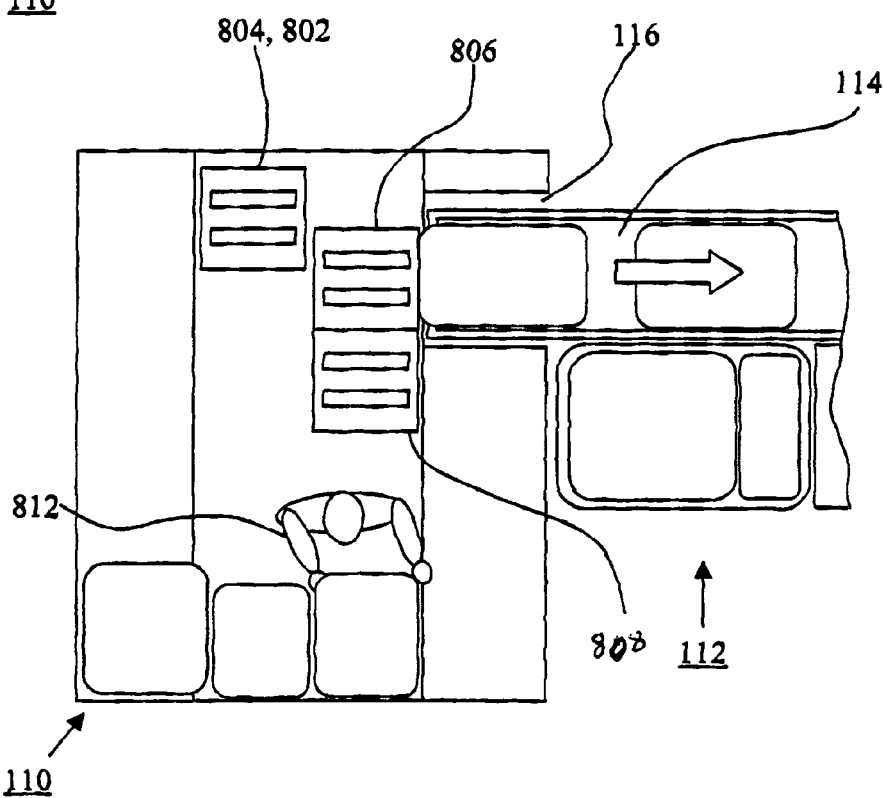

Referring now to FIG. 8e, the conveyor unit 806 is shown within the different portion of the floor 810 proximate the opening 116 and adjacent the conveyor unit 808. Preferably, the conveyor unit 806 is detachably coupled to the conveyor unit 808, so as to form a conveyor path extending from the opening 116 in a direction toward the remaining baggage items to be unloaded, thereby requiring the baggage handler to perform less lifting, twisting and other manual baggage handling steps that may result in injury. Further advantageously, the same baggage handler that is unloading the cargo compartment 110 also couples the conveyor unit 806 to the conveyor unit 808, such that no additional baggage items are loaded onto the conveyor path while the conveyor units are being coupled together.

Figure 9:
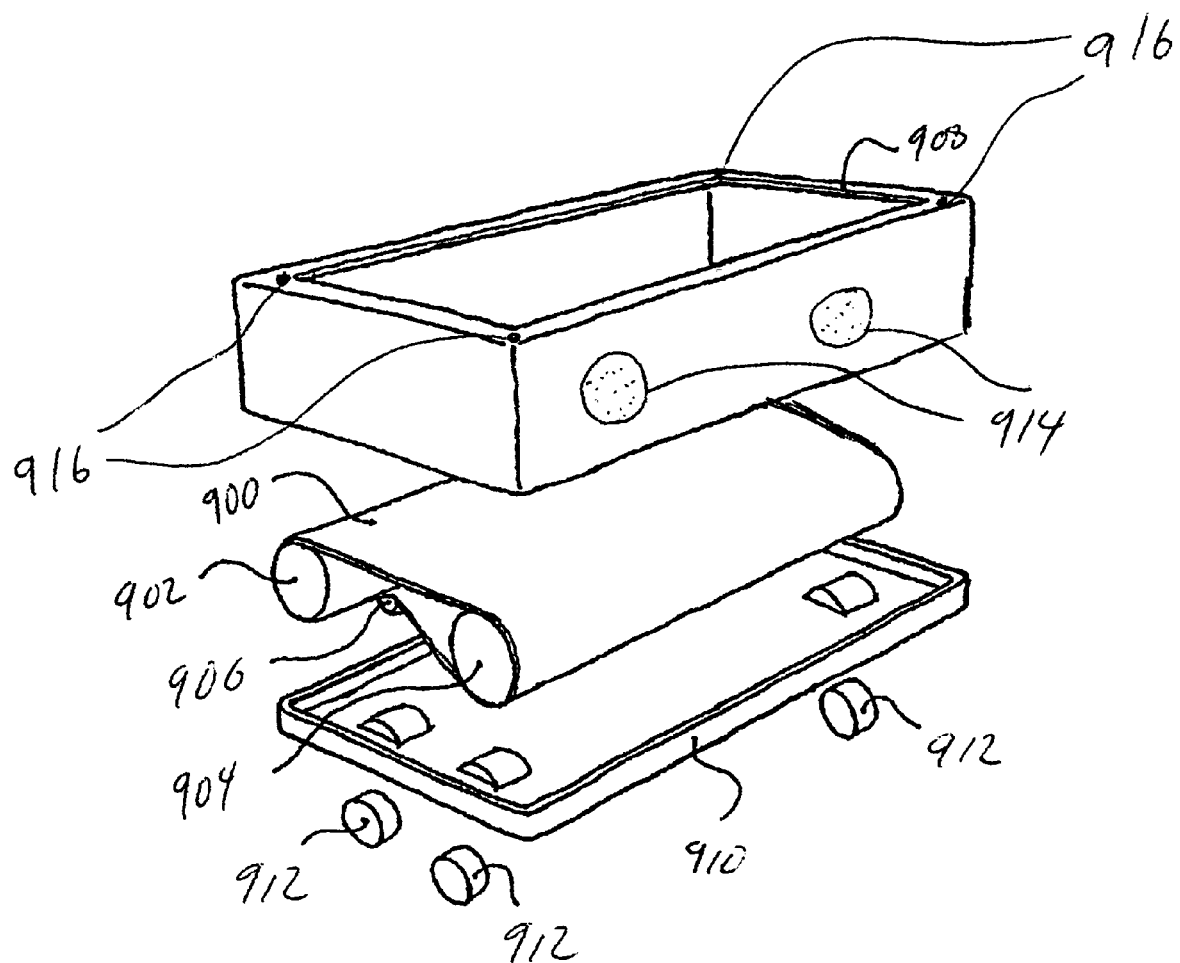
FIG. 9 is a diagrammatic perspective view of a conveyor unit according to an embodiment of the instant invention.

Referring now to FIG. 9, shown is a diagrammatic perspective view of a conveyor unit 106 according to an embodiment of the instant invention. In particular, the conveyor unit 106 is shown including an optional continuous conveyor belt 900 driven around suitable rollers 902, 904, 906. These rollers are journalled in a frame 908 arranged on a support member 910. The support member 910 is arranged on rollers or wheels 912. The frame 908 includes a coupling structure such as for instance magnetic connectors 914, for detachably coupling with a similarly arranged coupling structure of another conveyor unit. Advantageously, the magnetic couplers 914 support rapid and detachable coupling of conveyor units as well as automatic alignment of conveyor units. In particular, conveyor units are readily detached one from another simply by pulling the magnetic couplers 914 on the conveyor units out of mutual contact. Preferably, the frame 908 includes a structure, such as for instance guide holes 916, for supporting stacking of a plurality of conveyor units. For example, other conveyor units include protrusions along the lower surface thereof for engaging the guide holes 916 of frame 908 when in a stacked condition.

Figure 10:
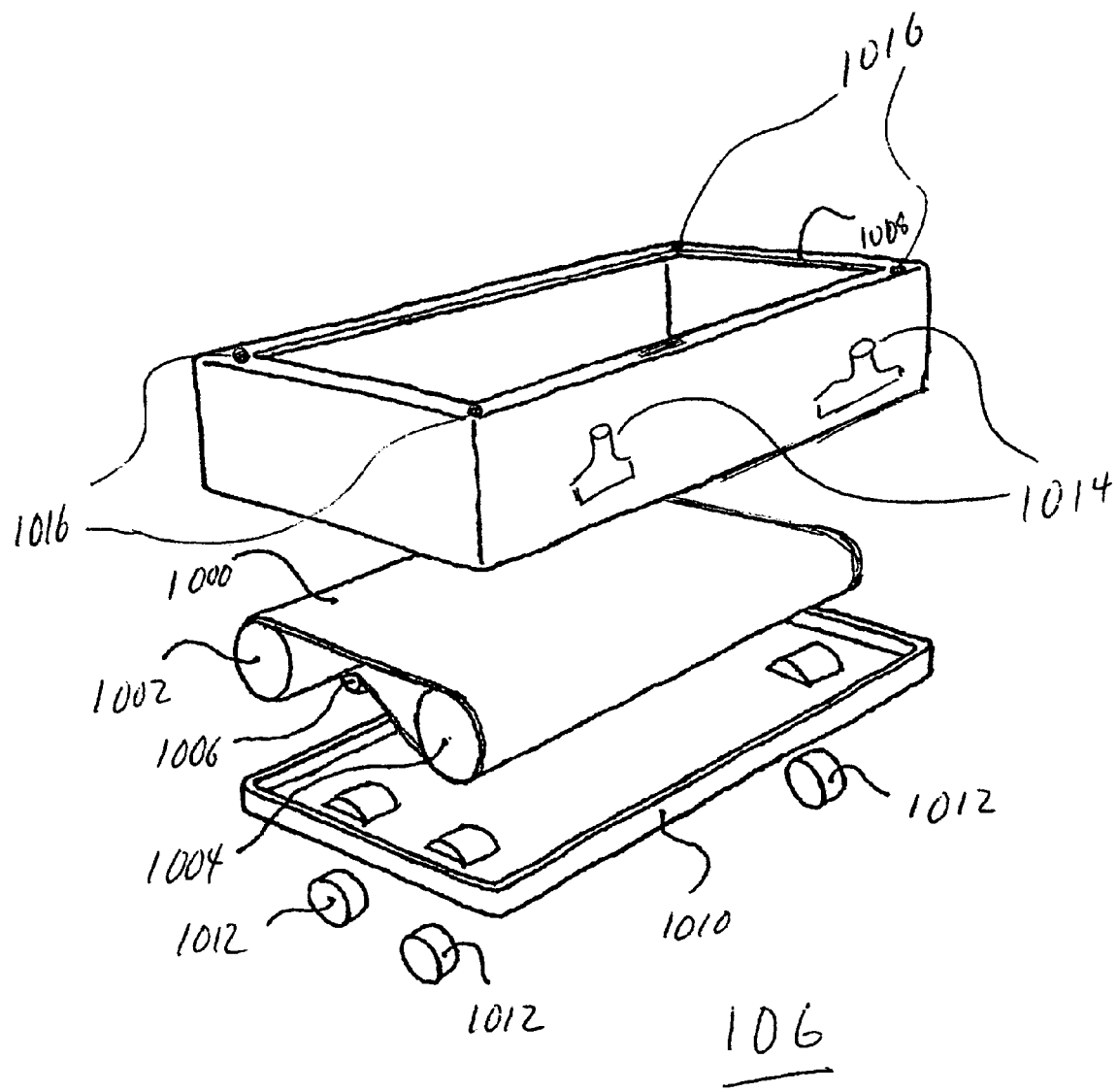
FIG. 10 is a diagrammatic perspective view of a conveyor unit according to an embodiment of the instant invention.

Referring now to FIG. 10, shown is a diagrammatic perspective view of a conveyor unit 106 according to an embodiment of the instant invention. In particular, the conveyor unit 106 is shown including an optional continuous conveyor belt 1000 driven around suitable rollers 1002, 1004, and 1006. These rollers are journalled in a frame 1008 arranged on a support member 1010. The support member 1010 is arranged on rollers or wheels 1012. The frame 1008 includes a coupling structure such as for instance peg-shaped protrusions 1014. The coupling structure is for detachably coupling with a receiving structure of another conveyor unit. Advantageously, the peg-shaped protrusions 1014 support rapid coupling of conveyor units and automatic alignment of conveyor units. Of course, the coupling structure is not intended to be limited to only peg-shaped protrusions, but rather to include any suitably shaped protrusion. Preferably, the frame 1008 includes a structure, such as for instance guide holes 1016, for supporting stacking of a plurality of conveyor units. For example, other conveyor units include protrusions along the lower surface thereof for engaging the guide holes 1016 of frame 1008 when in a stacked condition.

Figure 11:
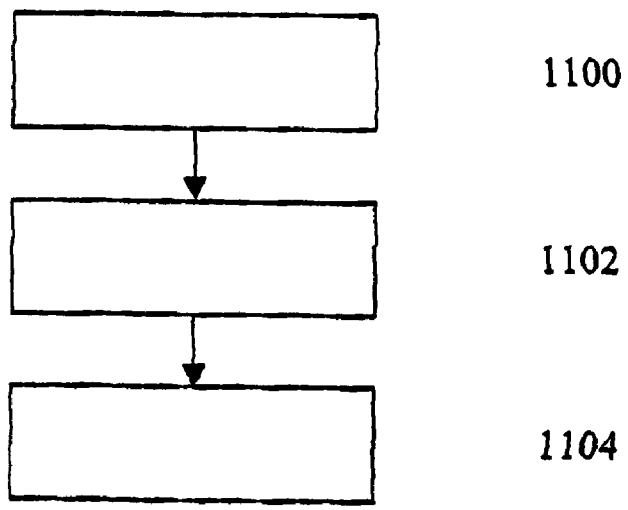
FIG. 11 is a simplified flow diagram of a method of unloading a cargo compartment of an aircraft according to an embodiment of the instant invention.

Referring now to FIG. 11, shown is a simplified flow diagram of a method of unloading a cargo compartment of an aircraft according to an embodiment of the instant invention. At step 1100, a first conveyor unit is placed along a floor surface of the cargo compartment proximate an opening to the cargo compartment. At step 1102, a second conveyor unit is disposed adjacent to the first conveyor unit, so as to assemble within the cargo compartment a conveyor path extending along a direction away from the opening. At step 1104, at least a baggage item is conveyed along the conveyor path including the first and second conveyor units and out through the opening. Optionally the step of disposing a second conveyor unit adjacent to the first conveyor unit includes a step of detachably connecting the second conveyor unit to the first conveyor unit. Of course, the above steps need not be performed in the specific order that is disclosed. For instance, when space is limited during early stages of unloading, the steps may optionally be performed in the order 1100, 1104, 1102. By performing step 1104 prior to step 1102, at least a baggage item is removed from the cargo compartment, so as to provide additional space for assembling the conveyor path during step 1102. In this case, additional baggage items optionally are conveyed along the conveyor path subsequent to performing step 1102.

Figure 12:
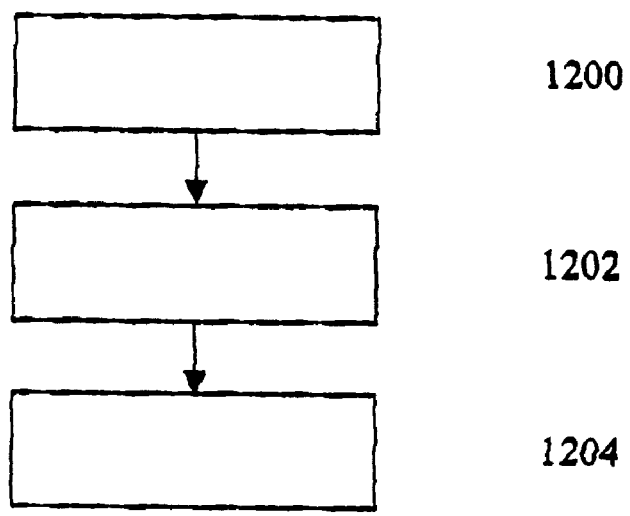
FIG. 12 is a simplified flow diagram of another method of unloading a cargo compartment of an aircraft according to an embodiment of the instant invention; and, FIG. 13 is a diagrammatic top view of a conveyor system according to an embodiment of the instant invention, shown with a conveyor unit advancer separate from the baggage conveyor ramp.

Referring now to FIG. 12, shown is a simplified flow diagram of another method of unloading a cargo compartment of an aircraft according to an embodiment of the instant invention. At step 1200 an angled conveyor unit is placed along a floor surface of the cargo compartment proximate an opening to the cargo compartment. At step 1202, a linear conveyor unit is disposed adjacent to the angled conveyor unit, so as to assemble within the cargo compartment a conveyor path extending along a direction away from the opening. At step 1204, at least a baggage item is conveyed along the conveyor path including the angled conveyor unit and the linear conveyor unit and out through the opening. Optionally the step of disposing a linear conveyor unit adjacent to the angled conveyor unit includes a step of detachably connecting the linear conveyor unit to the angled conveyor unit. Of course, the above steps need not be performed in the specific order that is disclosed. For instance, when space is limited during early stages of unloading, the steps may optionally be performed in the order 1200, 1204, 1202. By performing step 1204 prior to step 1202, at least a baggage item is removed from the cargo compartment, so as to provide additional space for assembling the conveyor path during step 1202. In this case, additional baggage items optionally are conveyed along the conveyor path subsequent to performing step 1202.

Figure 13:
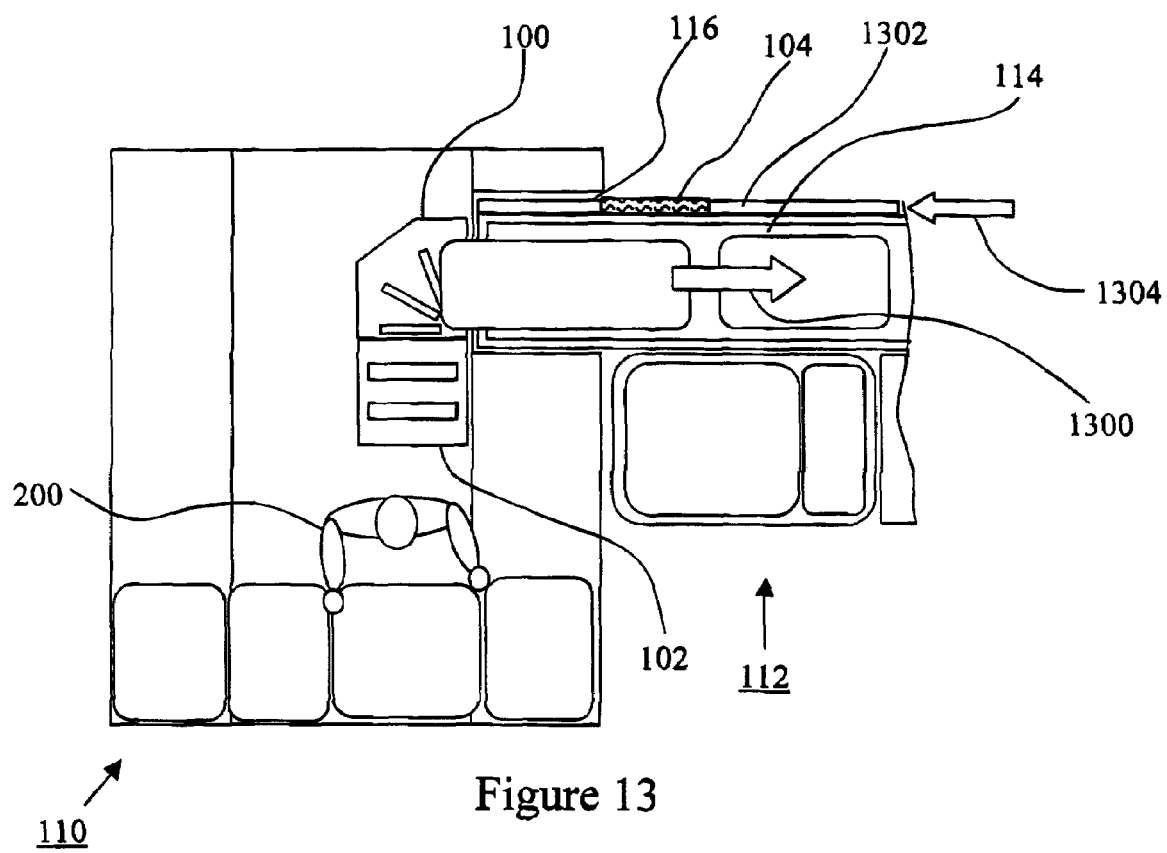

Referring now to FIG. 13, shown is a diagrammatic top view of a conveyor system according to an embodiment of the instant invention, with a conveyor unit advancer separate from the baggage conveyor ramp. In particular, a belt loader 112 includes a conveyor ramp 114 for advancing baggage items along a baggage flow direction indicated by the block arrow 1300, the inclination of which ramp is adjustable for being aligned with opening 116 of the cargo compartment 110. The baggage ramp vehicle also includes a conveyor unit advancer 1302 for conveying conveyor units along a direction opposite the baggage flow direction, as indicated by the block arrow 1304. For instance, in FIG. 13 the conveyor unit 104 is shown in edge-on view being conveyed toward the cargo compartment 110 via opening 116.

Optionally, when the conveyor unit 104 reaches the edge of the cargo compartment 110 a baggage handler inside the cargo compartment manually lifts the conveyor unit 104 off of the conveyor unit advancer and couples the conveyor unit 104 to the end of the conveyor path adjacent conveyor unit 102. Further optionally, the conveyor unit 104 advances into the cargo compartment 110 and is conveyed to the end of the conveyor path in an automated manner. For instance, the conveyor unit 104 is advanced along side the conveyor units 100 and 102 toward the end of the conveyor path. Optionally, the direction of baggage flow is reversed temporarily, and the conveyor unit 104 is conveyed along the top surfaces of the conveyor units 100 and 102.

As an alternative to the above-mentioned systems for advancing conveyor units into the cargo compartment, use may be made of a lift mechanism that is separate from the conveyor ramp 114. For instance, a separate elevating device similar to a fork-lift mechanism may be mounted to a portion of the belt loader 112. The conveyor units, secured within a frame, are raised to a level approximately elevationally aligned with the opening 116. Preferably, the conveyor units are readily accessible from inside the compartment 110. During use, the conveyor units are extracted from the frame and coupled to other conveyor units within the cargo compartment 110. The conveyor units are extracted from the frame in one of an automated and a manual fashion. Of course, where space permits, the frame optionally may be attached to the end of the conveyor ramp 114 rather than being supported by a separate lift mechanism. For instance, the frame is one of welded to the end of the conveyor ramp 114 and fastened to the end of the conveyor ramp 114 using suitable fasteners such as for example threaded bolts and nuts. In this way, when the conveyor ramp 114 is aligned with the opening 116 the frame containing the conveyor units automatically is brought to a position proximate the opening 116 as well. Optionally, the conveyor units are extracted from the frame in one of a manual and an automated fashion.

According to at least some of the embodiments of the instant invention a conveyor path is assembled within the cargo compartment of an aircraft, and in a progressive manner as baggage is removed from the cargo compartment. The number of conveyor units required during a particular unloading and/or loading cycle may be determined in advance based upon known dimensions of the conveyor units and a known length of the cargo compartment. Optionally, the determined number of conveyor units is provided into the cargo compartment prior to any of the baggage being unloaded. The conveyor path reduces the amount of manual baggage handling, and thereby reduces the likelihood of injuries occurring. If is an advantage that the conveyor path is disassembled during the loading operation and removed entirely from the cargo compartment. In this way, the system does not add any additional in-flight weight to the aircraft. The embodiments of the instant invention also are suitable for use with existing mobile baggage ramp vehicles, and do not require the purchase of additional vehicles that are adapted to store at least some of the conveyor units within a portion thereof. Furthermore, the system is expandable since additional conveyor units may be provided into the cargo compartment if it is necessary to span greater distances, such as for instance in stretch models of certain aircraft. Optionally, at least some of the embodiments of the instant invention include conveyor units, the length of which is extendable. For instance, the length of at least one conveyor unit is extendable by a factor of between 1.5 and 2 times the non-extended length.

Numerous other embodiments may be envisaged without departing from the spirit and scope of the invention.

What is claimed is:

1. An apparatus for loading and unloading a cargo compartment of an aircraft, comprising:

a plurality of conveyor units for being disposed within the cargo compartment of the aircraft, each conveyor unit having a first end for receiving cargo and a second end for discharging cargo, the first end of each conveyor unit configured for communicating with the second end of an adjacent conveyor unit so as to form a conveyor path having a length, wherein during use a user inside the cargo compartment decouples or couples the conveyor units of the plurality of conveyor units such that the number of conveyor units of the plurality of conveyor units is variable during a loading or unloading operation, respectively, for controllably adjusting the length of the conveyor path between a first end and a second end thereof, wherein each conveyor unit of the plurality of conveyor units comprises a coupling structure for being detachably coupled with a coupling structure of another conveyor unit, the coupling structure for supporting decoupling or coupling of the conveyor units by the user inside the cargo compartment during the loading or unloading operation, respectively, wherein the coupling structure comprises a magnetic coupler.

2. An apparatus according to claim 1, wherein the plurality of conveyor units includes an angled conveyor unit for being disposed at the first end of the conveyor path and adjacent an opening of the cargo compartment, the angled conveyor unit for directing cargo horizontally through a fixed angle about a point along the conveyor path.

3. An apparatus according to claim 2, wherein the plurality of conveyor units includes at least one linear conveyor unit for directing cargo along a straight path.

4. An apparatus according to claim 1, wherein each conveyor unit of the plurality of conveyor units comprises at least two rollers for engaging a lower surface of baggage items passing there above.

5. An apparatus according to claim 4, wherein at least one of the at least two rollers is a powered roller.

6. An apparatus according to claim 1, wherein each conveyor unit of the plurality of conveyor units comprises a slider belt conveyor.

7. An apparatus according to claim 1, wherein each conveyor unit of the plurality of conveyor units comprises a continuous conveyor belt.

8. An apparatus according to claim 1, wherein a length of at least one conveyor unit of the plurality of conveyor units is extendable.

9. An apparatus, for loading and unloading a cargo compartment of an aircraft, comprising:

a plurality of conveyor units for being disposed within the cargo compartment of the aircraft, each conveyor unit having a first end for receiving cargo and a second end for discharging cargo, the first end of each conveyor unit configured for communicating with the second end of an adjacent conveyor unit so as to form a conveyor path having a length, at least one conveyor unit of the plurality of conveyor units including an inclinable ramp mounted to a base, the inclinable ramp for conveying cargo elevationally, one end of the inclinable ramp being pivotably mounted to the base about a vertical axis, for supporting a pivoting motion of the inclinable ramp relative to the base, wherein during use a user inside the cargo compartment decouples or couples the conveyor units of the plurality of conveyor units such that the number of conveyor units of the plurality of conveyor units is variable during a loading or unloading operation, respectively, for controllably adjusting the length of the conveyor path between a first end and a second end thereof.

10. An apparatus for loading and unloading a cargo compartment of an aircraft, comprising:

a first conveyor unit for being disposed within the cargo compartment of the aircraft and having a first end for receiving cargo and a second end for discharging cargo along a direction of travel;

a second conveyor unit for being disposed within the cargo compartment of the aircraft and having a first end that is detachably connectable to the second end of the first conveyor unit for receiving cargo therefrom along the direction of travel; and, a coupling mechanism having a first portion mounted to the first conveyor unit and having a second portion mounted to the second conveyor unit, the first and second portions of the coupling mechanism for cooperating to retain the first conveyor unit and the second conveyor unit in a fixed orientation one relative to the other when in a coupled condition, wherein during use a user inside the cargo compartment uses the coupling mechanism to couple the first conveyor unit and the second conveyor unit during an unloading operation and uses the coupling mechanism to decouple the first conveyor unit and the second conveyor unit during a loading operation, so as to controllably vary a length of a conveyor path within the cargo compartment, wherein the coupling mechanism comprises a magnetic coupler.

11. An apparatus according to claim 10, wherein the first conveyor unit is an angled conveyor unit for being disposed adjacent an opening of the cargo compartment, the angled conveyor unit for directing cargo horizontally through a fixed angle about a point along the conveyor path.

12. An apparatus according to claim 11, wherein the second conveyor unit is a linear conveyor unit for directing cargo along a straight portion of the conveyor path.

13. An apparatus according to claim 10, wherein each one of the first conveyor unit and the second conveyor unit comprises at least two rollers for engaging a lower surface of baggage items passing there above.

14. An apparatus according to claim 13, wherein at least one of the at least two rollers is a powered roller.

15. An apparatus according to claim 10, wherein at least one of the first conveyor unit and the second conveyor unit comprises a slider belt conveyor.

16. An apparatus according to claim 10, wherein at least one of the first conveyor unit and the second conveyor unit comprises a continuous conveyor belt.

17. An apparatus for loading and unloading a cargo compartment of an aircraft, comprising:

a first conveyor unit for being disposed within the cargo compartment of the aircraft and having a first end for receiving cargo and a second end for discharging cargo along a direction of travel;

a second conveyor unit for being disposed within the cargo compartment of the aircraft and having a first end that is detachably connectable to the second end of the first conveyor unit for receiving cargo therefrom along the direction of travel, the second conveyor unit including an inclinable ramp mounted to a base, the inclinable ramp for conveying cargo elevationally, one end of the inclinable ramp being pivotably mounted to the base about a vertical axis, for supporting a pivoting motion of the inclinable ramp relative to the base; and, a coupling mechanism having a first portion mounted to the first conveyor unit and having a second portion mounted to the second conveyor unit, the first and second portions of the coupling mechanism for cooperating to retain the first conveyor unit and the second conveyor unit in a fixed orientation one relative to the other when in a coupled condition, wherein during use a user inside the cargo compartment uses the coupling mechanism to couple the first conveyor unit and the second conveyor unit during an unloading operation and uses the coupling mechanism to decouple the first conveyor unit and the second conveyor unit during a loading operation, so as to controllably a length of a conveyor path within the cargo compartment.

18. An apparatus according to claim 10, wherein a length of the second conveyor unit is extendable.

* * * * *